(12) United States Patent
Zhu et al.

(10) Patent No.: US 12,293,069 B2
(45) Date of Patent: May 6, 2025

(54) SCREEN CAPTURING METHOD AND ELECTRONIC DEVICE

(71) Applicant: HUAWEI TECHNOLOGIES CO., LTD., Shenzhen (CN)

(72) Inventors: Fuchun Zhu, Wuhan (CN); Jun Zhao, Xi'an (CN); Liang Chen, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/003,873

(22) PCT Filed: Jun. 10, 2021

(86) PCT No.: PCT/CN2021/099507
§ 371 (c)(1),
(2) Date: Dec. 29, 2022

(87) PCT Pub. No.: WO2022/001619
PCT Pub. Date: Jan. 6, 2022

(65) Prior Publication Data
US 2023/0176723 A1    Jun. 8, 2023

(30) Foreign Application Priority Data
Jun. 29, 2020    (CN) .......................... 202010605395.3

(51) Int. Cl.
*G06F 3/048*    (2013.01)
*G06F 3/0486*    (2013.01)
*G06F 3/0488*    (2022.01)

(52) U.S. Cl.
CPC .......... *G06F 3/0486* (2013.01); *G06F 3/0488* (2013.01); *G06F 2203/04803* (2013.01)

(58) Field of Classification Search
CPC ................. G06F 3/0486; G06F 3/0488; G06F 2203/04803
See application file for complete search history.

(56) References Cited

U.S. PATENT DOCUMENTS 5,835,919 A * 11/1998 Stern ....................... G06T 11/60
715/764
10,588,719 B2    3/2020 Ishiwata
(Continued)

FOREIGN PATENT DOCUMENTS

CN    105045485 A    11/2015
CN    105224276 A    1/2016
(Continued)

OTHER PUBLICATIONS

Sagar31 (https://r2.community.samsung.com/t5/Tech-Talk/ONEUI-2-can-automatically-crop-screenshots-on-your-galaxy/td-p/2994734, attached as pdf) (Year: 2019).*
(Continued)

*Primary Examiner* — Aleksey Olshannikov
(74) *Attorney, Agent, or Firm* — Leydig, Voit & Mayer, Ltd.

(57) ABSTRACT

A screen capturing method includes: In a screen split state, an electronic device displays N applications respectively by using N split screens, where one split screen is configured to display an interface of one application, and N is a positive integer greater than 1; further, the electronic device receives a screen capturing operation for a target split screen, where the target split screen includes at least one split screen; finally, in response to the screen capturing operation, the electronic device displays, in full screen, an interface of an application corresponding to each split screen in the target split screen, and generates a screenshot picture, where the screenshot picture includes a full-displayed interface of the application corresponding to each split screen in the target split screen.

20 Claims, 35 Drawing Sheets

(56) References Cited

U.S. PATENT DOCUMENTS

| | | | |
|---|---|---|---|
| 2014/0313389 A1 | 10/2014 | Kim et al. | |
| 2016/0179341 A1* | 6/2016 | Cho | G06F 3/0486 715/769 |
| 2016/0313883 A1* | 10/2016 | Zhang | G06F 3/04883 |
| 2019/0147026 A1* | 5/2019 | Jon | G06F 40/171 715/230 |
| 2019/0377536 A1 | 12/2019 | Wang | |
| 2020/0004387 A1* | 1/2020 | Kim | G06F 3/0481 |

FOREIGN PATENT DOCUMENTS

| | | |
|---|---|---|
| CN | 106911850 A | 6/2017 |
| CN | 106940621 A | 7/2017 |
| CN | 107301013 A | 10/2017 |
| CN | 107896279 A | 4/2018 |
| CN | 107977144 A | 5/2018 |
| CN | 109388304 A | 2/2019 |
| CN | 110096326 A | 8/2019 |
| CN | 110597439 A | 12/2019 |
| CN | 111078091 A | 4/2020 |

OTHER PUBLICATIONS

CN/202010605395.3, Office Action and Search Report, Jul. 15, 2023.

\* cited by examiner

SCREEN CAPTURING METHOD AND ELECTRONIC DEVICE

This application is a National Stage of International Application No. PCT/CN2021/099507 filed on Jun. 10, 2021, which claims priority to Chinese Patent Application No. 202010605395.3, filed on Jun. 29, 2020, both of which are hereby incorporated by reference in their entireties.

TECHNICAL FIELD

This application relates to the field of computer technologies, and in particular, to a screen capturing method and a related device.

BACKGROUND

With the popularization of intelligent electronic products, electronic information has become the main form of daily information exchange. A screen capturing technology has become one of the indispensable technologies in the process of information saving and information sharing because the screen capturing technology can conveniently obtain electronic information such as texts and pictures.

In the conventional technology, screen capturing is mainly for an entire screen, for example, full screen capturing or scrolling screen capturing. To obtain a screenshot picture corresponding to a split screen included in the screen, in an existing implementation, a screenshot picture is first obtained through a screen capturing operation, where the screenshot picture includes an interface of an application corresponding to each split screen in a screen split state. Further, the screenshot picture of the application corresponding to each split screen may be obtained by cropping the screenshot picture.

It can be learned that each split screen displays an application separately. Compared with the entire screen, because a region of each split screen for displaying the application is small, an amount of content displayed by each split screen in the screen split state is usually small, and it is difficult to meet a requirement of a user for obtaining information from the screenshot picture. Therefore, in the screen split state, how to improve an image effect of an application corresponding to a split screen obtained through capturing has become a technical issue to be urgently addressed at present.

SUMMARY

Embodiments of this application provide a screen capturing method and an electronic device. In a screen split state, the electronic device may display, in full screen, an interface of an application corresponding to a to-be-captured split screen, to obtain a full-displayed interface of the application corresponding to the target split screen, and further obtain a screenshot picture after saving and processing, so that an image effect of the screenshot picture obtained in the screen split state can be improved.

According to a first aspect, an embodiment of this application provides a screen capturing method.

The method includes, in a screen split state, an electronic device displays N applications respectively by using N split screens, where one split screen is configured to display an interface of one application, and N is a positive integer greater than 1; further, the electronic device receives a screen capturing operation for a target split screen, where the target split screen includes at least one split screen; finally, in response to the screen capturing operation, the electronic device displays, in full screen, an interface of an application corresponding to each split screen in the target split screen, and generates a screenshot picture, where the screenshot picture includes a full-displayed interface of the application corresponding to each split screen in the target split screen.

It should be understood that, in this embodiment of this application, the electronic device may be a device with a display such as a mobile phone, a tablet computer, a computer, or a television. The screen capturing operation may be a gesture operation, for example, a gesture such as knock (single knock, double knock, or the like) or tap (double tap, triple tap, or the like), and the screen capturing operation may be alternatively an input performed on a screen by using another device, for example, double tap on the screen by using a stylus.

In the foregoing method, when receiving the screen capturing operation, the electronic device may obtain the target split screen based on a first location at which the screen capturing operation is input on the screen, and further, the electronic device displays, in full screen, the interface of the application corresponding to each split screen included in the target split screen, to save and obtain the full-displayed interface of the application corresponding to each split screen included in the target split screen; and further, the electronic device performs processing based on the full-displayed interface of the application corresponding to each split screen included in the target split screen, to obtain the screenshot picture. It can be learned from the foregoing description that, by implementing this embodiment of this application, the screenshot picture includes the full-displayed interface of the application corresponding to each split screen in the target split screen. In one aspect, a problem that an image in the screen split state is small is resolved. In a further aspect, interface content of the application in the full screen state is richer. Therefore, picture quality of the screenshot picture obtained in the screen split state can be improved.

In an optional implementation, the N split screens form M border lines, M is a positive integer, and that the electronic device receives a screen capturing operation for a target split screen specifically includes: The electronic device receives the screen capturing operation input at a first location; and further, the electronic device determines the target split screen based on the first location and the M border lines.

In an optional implementation, the M border lines are parallel to each other, and that the electronic device determines the target split screen based on the first location and the M border lines specifically includes: The electronic device determines a distance between the first location and each of the M border lines, to obtain a first distance set; further, the electronic device determines that a border line corresponding to a smallest distance in the first distance set is a first border line; and finally, when the smallest distance is greater than a first threshold, the electronic device determines that a split screen to which the first location belongs in the N split screens is the target split screen.

In an optional implementation, when the smallest distance is less than or equal to the first threshold, the electronic device determines that two split screens distinguished by the first border line are the target split screen.

It should be understood that, the first threshold may be set based on an actual situation.

In an optional implementation, the M border lines form at least one intersection point, and that the electronic device determines the target split screen based on the first location and the M border lines specifically includes: the electronic device determines a distance between the first location and each of the at least one intersection point, to obtain a second distance set; further, the electronic device determines that an intersection point corresponding to a smallest distance in the second distance set is a target intersection point; then, the electronic device determines a first range based on the target intersection point, where the first range uses the target intersection point as a geometric center, and the first range includes the target intersection point; and finally, when detecting that the first location is not within the first range, the electronic device determines that a split screen to which the first location belongs in the N split screens is the target split screen.

In an optional implementation, the first range is a circle that uses the target intersection point as a circle center, and uses R as a radius.

In an optional implementation, the first range is a square that uses the target intersection point as a geometric center, and uses A as a side length.

It should be understood that, the first range may be alternatively another graph that uses the target intersection point as a geometric center, for example, a diamond. Fixation of the first range may be set based on actual application. This is not limited herein.

In an optional implementation, when detecting that the first location is within the first range, the electronic device determines that a split screen adjacent to the target intersection point is the target split screen.

In an optional implementation, the N split screens respectively display the N applications in a first layer, and after the screenshot picture is generated, the method further includes: the electronic device recovers, in the first layer, the screen split state in which the N split screens respectively display the N applications; and further, the electronic device displays a thumbnail of the screenshot picture above the first layer.

In an optional implementation, that in response to the screen capturing operation, the electronic device displays, in full screen, a full-screen interface of an application corresponding to each split screen in the target split screen, and generates a screenshot picture specifically includes: the electronic device sequentially displays, in full screen above the first layer, the interface of the application corresponding to each split screen in the target split screen; and further, the electronic device splices the full-displayed interface of the application corresponding to each split screen in the target split screen, to generate the screenshot picture.

In an optional implementation, that in response to the screen capturing operation, the electronic device displays, in full screen, a full-screen interface of an application corresponding to each split screen in the target split screen, and generates a screenshot picture specifically includes: the electronic device sequentially displays, in full screen in the first layer, the interface of the application corresponding to each split screen in the target split screen; and further, the electronic device splices the full-displayed interface of the application corresponding to each split screen in the target split screen, to generate the screenshot picture.

It should be understood that, without being limited by the foregoing implementation of displaying the full-screen interface of the application corresponding to each split screen in the target split screen, the electronic device may further display, in another manner, the interface of the application corresponding to each split screen in the target split screen. This is not limited in this application.

In an optional implementation, the screen capturing method further includes: the electronic device receives a drag operation for the thumbnail of the screenshot picture; and further, in response to the drag operation, when detecting that the drag operation disappears, the electronic device determines a to-be-executed split screen, and the electronic device performs a target operation on the screenshot picture by using an application corresponding to the to-be-executed split screen.

In an optional implementation, that in response to the drag operation, when detecting that the drag operation disappears, the electronic device determines a to-be-executed split screen specifically includes: The electronic device obtains a pixel value of the screenshot picture in each of the N split screens; and the electronic device determines that a split screen corresponding to a largest pixel value is the to-be-executed split screen.

In an optional implementation, that in response to the drag operation, when detecting that the drag operation disappears, the electronic device determines a to-be-executed split screen specifically includes: the electronic device determines that a split screen in which an endpoint location of the drag operation is located is the to-be-executed split screen.

It should be understood that, without being limited by the foregoing two implementations in which the electronic device determines the to-be-executed split screen, the to-be-executed split screen in the N split screens may be alternatively determined in another manner. This is not limited herein.

In an optional implementation, an application corresponding to the to-be-executed split screen is a chat window, and that the electronic device performs a target operation on the screenshot picture by using an application corresponding to the to-be-executed split screen specifically includes: the electronic device automatically sends the screenshot picture in the chat window.

In an optional implementation, an application corresponding to the to-be-executed split screen is document editing, and that the electronic device performs a target operation on the screenshot picture by using an application corresponding to the to-be-executed split screen includes: the electronic device places the screenshot picture at a focus location of the document editing.

In an optional implementation, an application corresponding to the to-be-executed split screen is a gallery, and that the electronic device performs a target operation on the screenshot picture by using an application corresponding to the to-be-executed split screen includes: the electronic device saves the screenshot picture in a specified storage folder of the gallery.

It should be understood that, without being limited by the foregoing application corresponding to the to-be-executed split screen, the application corresponding to the to-be-executed split screen may be alternatively another application. This is not limited herein.

According to a second aspect, an embodiment of this application further provides an electronic device, where the electronic device includes: one or more processors, a memory, and a display; the memory is coupled to the foregoing one or more processors, the memory is configured to store computer program code, the computer program code includes computer instructions, and the one or more processors are configured to invoke the computer instructions to enable the electronic device to perform the following operations:

in a screen split state, displaying N applications respectively by using N split screens, where one split screen is configured to display an interface of one application, and N is a positive integer greater than 1;

receiving a screen capturing operation for a target split screen, where the target split screen includes at least one split screen; and in response to the screen capturing operation, displaying, in full screen, an interface of an application corresponding to each split screen in the target split screen, and generating a screenshot picture, where the screenshot picture includes a full-displayed interface of the application corresponding to each split screen.

In an optional implementation, the N split screens form M border lines, M is a positive integer, and the one or more processors are specifically configured to invoke the computer instructions to enable the electronic device to perform the following operations: receiving the screen capturing operation input at a first location; and further, determining the target split screen based on the first location and the M border lines.

In an optional implementation, the M border lines are parallel to each other, and the one or more processors are specifically configured to invoke the computer instructions to enable the electronic device to perform the following operations: determining a distance between the first location and each of the M border lines, to obtain a first distance set; further, determining that a border line corresponding to a smallest distance in the first distance set is a first border line; and when the smallest distance is greater than a first threshold, determining that a split screen to which the first location belongs in the N split screens is the target split screen.

In a possible implementation, the one or more processors are further configured to invoke the computer instructions to enable the electronic device to perform the following operation: when the smallest distance is less than or equal to the first threshold, determining that two split screens distinguished by the first border line are the target split screen.

In an optional implementation, the M border lines form at least one intersection point, and the one or more processors are specifically configured to invoke the computer instructions to enable the electronic device to perform the following operations: determining a distance between the first location and each of the at least one intersection point, to obtain a second distance set; further, determining that an intersection point corresponding to a smallest distance in the second distance set is a target intersection point; then, determining a first range based on the target intersection point, where the first range uses the target intersection point as a geometric center, and the first range includes the target intersection point; and finally, when detecting that the first location is not within the first range, determining that a split screen to which the first location belongs in the N split screens is the target split screen.

In an optional implementation, the first range is a circle that uses the target intersection point as a circle center, and uses R as a radius.

In an optional implementation, the first range is a square that uses the target intersection point as a geometric center, and uses A as a side length.

In an optional implementation, the one or more processors are further configured to invoke the computer instructions to enable the electronic device to perform the following operation: when detecting that the first location is within the first range, determining that a split screen adjacent to the target intersection point is the target split screen.

In an optional implementation, the N split screens respectively display the N applications in a first layer, and the one or more processors are specifically configured to invoke the computer instructions to enable the electronic device to perform the following operations: recovering, in the first layer, the screen split state in which the N split screens respectively display the N applications; and further, displaying a thumbnail of the screenshot picture above the first layer.

In an optional implementation, in response to the screen capturing operation, the electronic device displays, in full screen, the full-screen interface of the application corresponding to each split screen in the target split screen, and generates the screenshot picture; and the one or more processors are specifically configured to invoke the computer instructions to enable the electronic device to perform the following operations: sequentially displaying, in full screen above the first layer, the interface of the application corresponding to each split screen in the target split screen; and further, splicing the full-displayed interface of the application corresponding to each split screen in the target split screen, to generate the screenshot picture.

In an optional implementation, in response to the screen capturing operation, the electronic device displays, in full screen, the full-screen interface of the application corresponding to each split screen in the target split screen, and generates the screenshot picture; and the one or more processors are specifically configured to invoke the computer instructions to enable the electronic device to perform the following operations: further, sequentially displaying, in full screen in the first layer, the interface of the application corresponding to each split screen in the target split screen; and finally, splicing the full-displayed interface of the application corresponding to each split screen in the target split screen, to generate the screenshot picture.

In an optional implementation, the one or more processors are specifically configured to invoke the computer instructions to enable the electronic device to perform the following operations: receiving a drag operation for the thumbnail of the screenshot picture; and further, in response to the drag operation, when detecting that the drag operation disappears, determining a to-be-executed split screen, and performing a target operation on the screenshot picture by using an application corresponding to the to-be-executed split screen.

In an optional implementation, in response to the drag operation, when it is detected that the drag operation disappears, the to-be-executed split screen is determined; and the one or more processors are specifically configured to invoke the computer instructions to enable the electronic device to perform the following operations: obtaining a pixel value of the screenshot picture in each of the N split screens; and further, determining that a split screen corresponding to a largest pixel value is the to-be-executed split screen.

In an optional implementation, in response to the drag operation, when it is detected that the drag operation disappears, the to-be-executed split screen is determined; and the one or more processors are specifically configured to invoke the computer instructions to enable the electronic device to perform the following operation: determining that a split screen in which an endpoint location of the drag operation is located is the to-be-executed split screen.

In an optional implementation, an application corresponding to the to-be-executed split screen is a chat window, and the electronic device performs the target operation on the screenshot picture by using the application corresponding to the to-be-executed split screen; and the one or more processors are specifically configured to invoke the computer instructions to enable the electronic device to perform the following operation: automatically sending the screenshot picture in the chat window.

In an optional implementation, an application corresponding to the to-be-executed split screen is document editing, and the electronic device performs the target operation on the screenshot picture by using the application corresponding to the to-be-executed split screen; and the one or more processors are specifically configured to invoke the computer instructions to enable the electronic device to perform the following operation: placing the screenshot picture at a focus location of the document editing.

In an optional implementation, an application corresponding to the to-be-executed split screen is a gallery, and the electronic device performs the target operation on the screenshot picture by using the application corresponding to the to-be-executed split screen; and the one or more processors are specifically configured to invoke the computer instructions to enable the electronic device to perform the following operation: saving the screenshot picture in a specified storage folder of the gallery.

According to a third aspect, an embodiment of this application provides a computer-readable storage medium, where the computer-readable medium is configured to store program code, and the program code is used to perform the method in the first aspect.

According to a fourth aspect, an embodiment of this application provides a computer program product including instructions. When the computer program product runs on a computer, the computer is enabled to perform the method in the first aspect.

BRIEF DESCRIPTION OF DRAWINGS

To describe technical solutions in embodiments of this application more clearly, the following describes the accompanying drawings used in embodiments of this application or in the background.

DESCRIPTION OF EMBODIMENTS

Terms used in the following embodiments of this application are merely intended to describe particular embodiments, but are not intended to limit the embodiments of this application. The terms "one", "a", "the", "the foregoing", "this", and "the one" of singular forms used in this specification and the appended claims of this application are also intended to include plural forms, unless otherwise specified in the context clearly. It should be further understood that, the term "and/or" used in embodiments of this application refers to and includes any or all possible combinations of one or more listed items.

It should be understood that, a screen split state in embodiments of this application means that one screen may display a plurality of split screens, and each split screen may be used to display an interface of one application. In embodiments of this application, N split screens are included, where N may be 2, 4, 3, or the like.

Figure 1A:
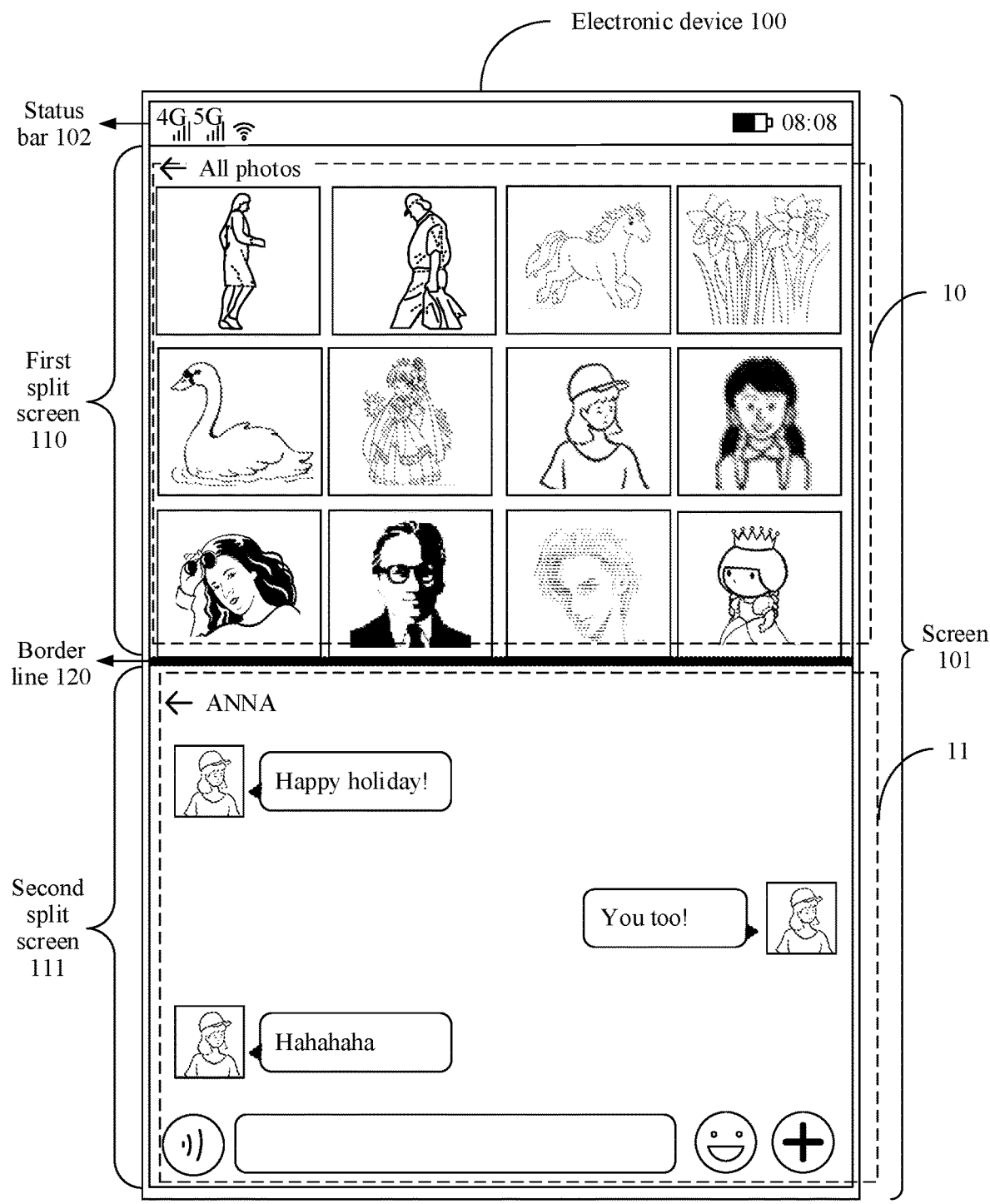
FIG. 1A and FIG. 1B are schematic diagrams of a screen split state according to an embodiment of this application.
Figure 1B:
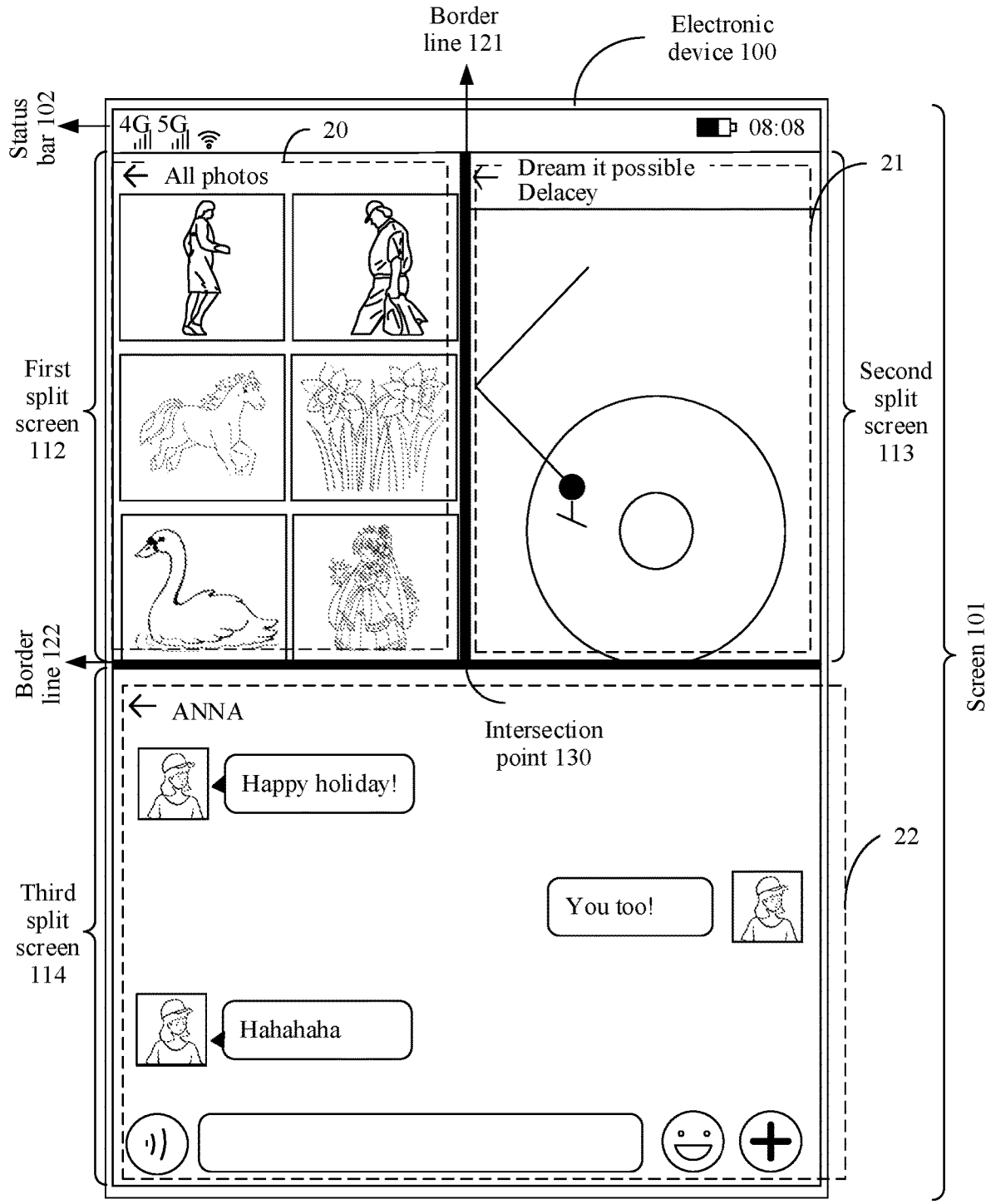

FIG. 1A and FIG. 1B are schematic diagrams of a screen split state according to an embodiment of this application. As shown in FIG. 1A and FIG. 1B, an electronic device 100 may display and run a plurality of applications simultaneously by using a screen 101 in a screen split state. The applications may include a social application (for example, WeChat, QQ, or Facebook), an image management application (for example, Album), a map application (for example, Baidu Map or Google Map), a browser application (for example, Safari or Google Chrome), a music application (for example, QQ Music and NetEase CloudMusic), and the like.

However, in the screen split state, compared with the entire electronic device 100 displaying an application in full screen, when one split screen displays an interface of one application, only partial content in a full screen state is usually displayed. Therefore, in the screen split state, in the existing screen capturing technology, an amount of display content of a screenshot picture obtained for one split screen is usually small, and it is difficult to meet a requirement of a user for obtaining information from the screenshot picture.

Therefore, an embodiment of this application provides a screen capturing method, to improve quality of a screenshot picture generated in a screen split state.

The following describes a user interface provided in this embodiment of this application.

It should be understood that screen split forms displayed in the screen split state may include two categories. In a first category, border lines between split screens do not form an intersection point (the border lines are parallel to each other). As shown in FIG. 1A, a screen 101 of the electronic device 100 displays a status bar 102 and two split screens, the two split screens are respectively a first split screen 110 and a second split screen 111, and the first split screen 110 and the second split screen 111 are distinguished by using a border line 120. The first split screen 110 displays a user interface 10 of a gallery, the user interface 10 of the gallery includes thumbnails of a plurality of images, and a user may touch the thumbnails to open corresponding pictures. The second split screen 111 displays a user interface 11 of WeChat. The status bar 102 may include a signal class, a signal strength, time, a Wi-Fi icon, a current remaining power level, and the like. In a second category, border lines that distinguish split screens intersect to form at least one intersection point, for example, an intersection point 130 shown in FIG. 1B. In this case, the electronic device 100 displays three split screens by using the screen 101, which are respectively a first split screen 112, a second split screen 113, and a third split screen 114. The first split screen 112 and the second split screen 113 are distinguished by using a border line 121, and the third split screen 114 is distinguished from another split screen by using a border line 122. The first split screen 112 displays a user interface 20 of the gallery, the second split screen 113 displays an interface 21 of NetEase CloudMusic, and the third split screen 114 displays a user interface 22 of WeChat. The case shown in FIG. 1B is more common in an embodiment in which the electronic device 100 has a large screen 101. For example, the electronic device 100 is a tablet computer, a computer, or a television.

Figure 1C:
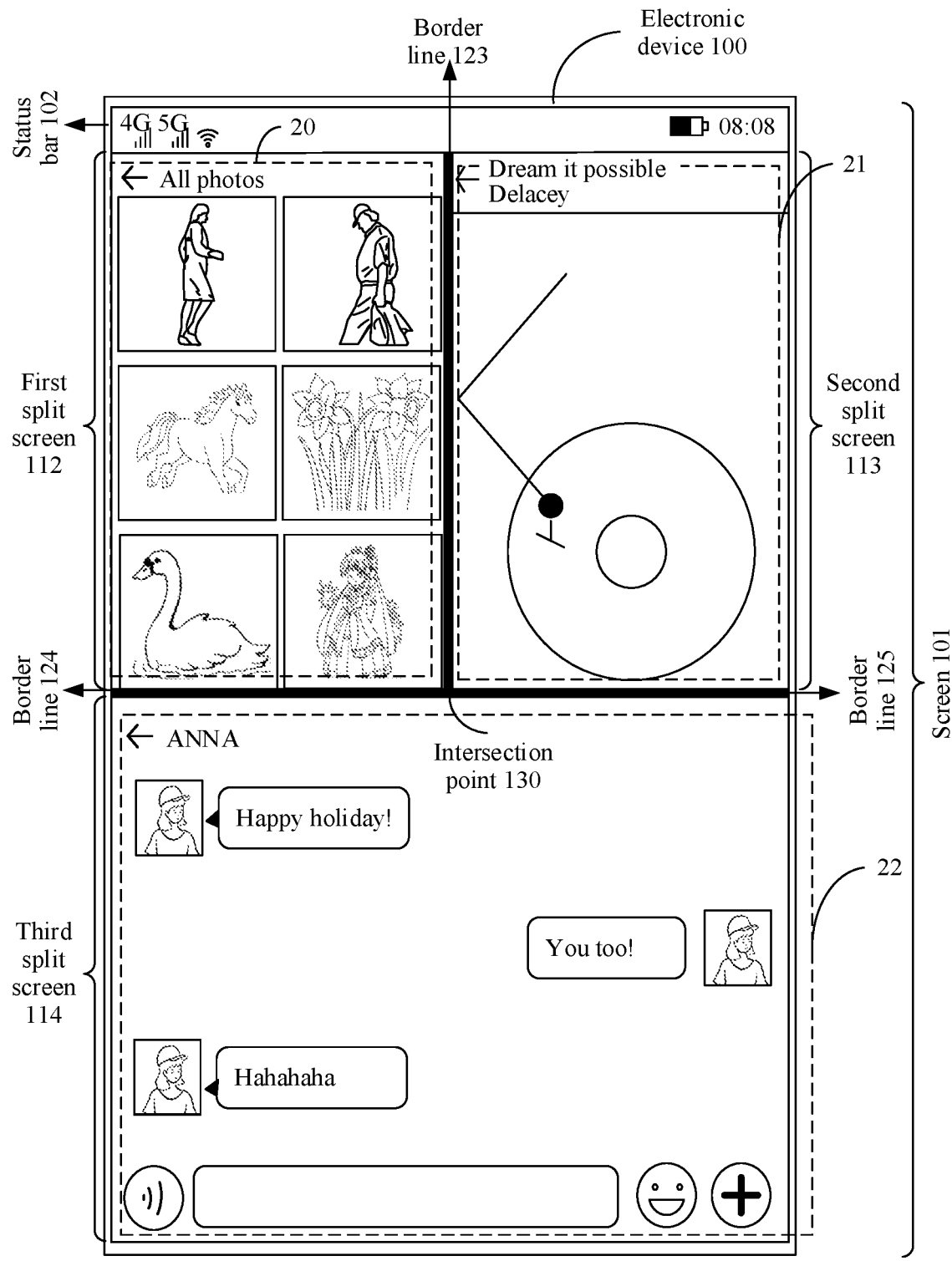
FIG. 1C shows a division manner of border lines according to an embodiment of this application.

In a possible implementation, if the border lines that distinguish split screens intersect to form at least one intersection point, division of the border lines may be further related to the formed intersection point. As shown in FIG. 1C, in this case, the screen 101 displays three border lines, which are respectively a border line 123, a border line 124, and a border line 125. The first split screen 112 is distinguished from other split screens by using the border line 123 and the border line 124, the second split screen 113 is distinguished from other split screens by using the border line 123 and the border line 125, and the third split screen 114 is distinguished from other split screens by using the border line 124 and the border line 125.

In the screen split state, the electronic device 100 may receive an input screen capturing operation, and further obtain a corresponding screenshot picture based on the screen capturing operation. The screen capturing operation may be a touch operation in forms such as double tap, triple tap, and knock (e.g., single knock or two successive knocks) or another gesture operation performed by a user on the screen, or an input operation performed by using an input device on the screen, for example, a tap operation of a cursor controlled by a mouse on a screen of a computer, or a tap operation of a stylus on a screen of a tablet computer or a mobile phone. This is not limited herein.

Figure 2A:
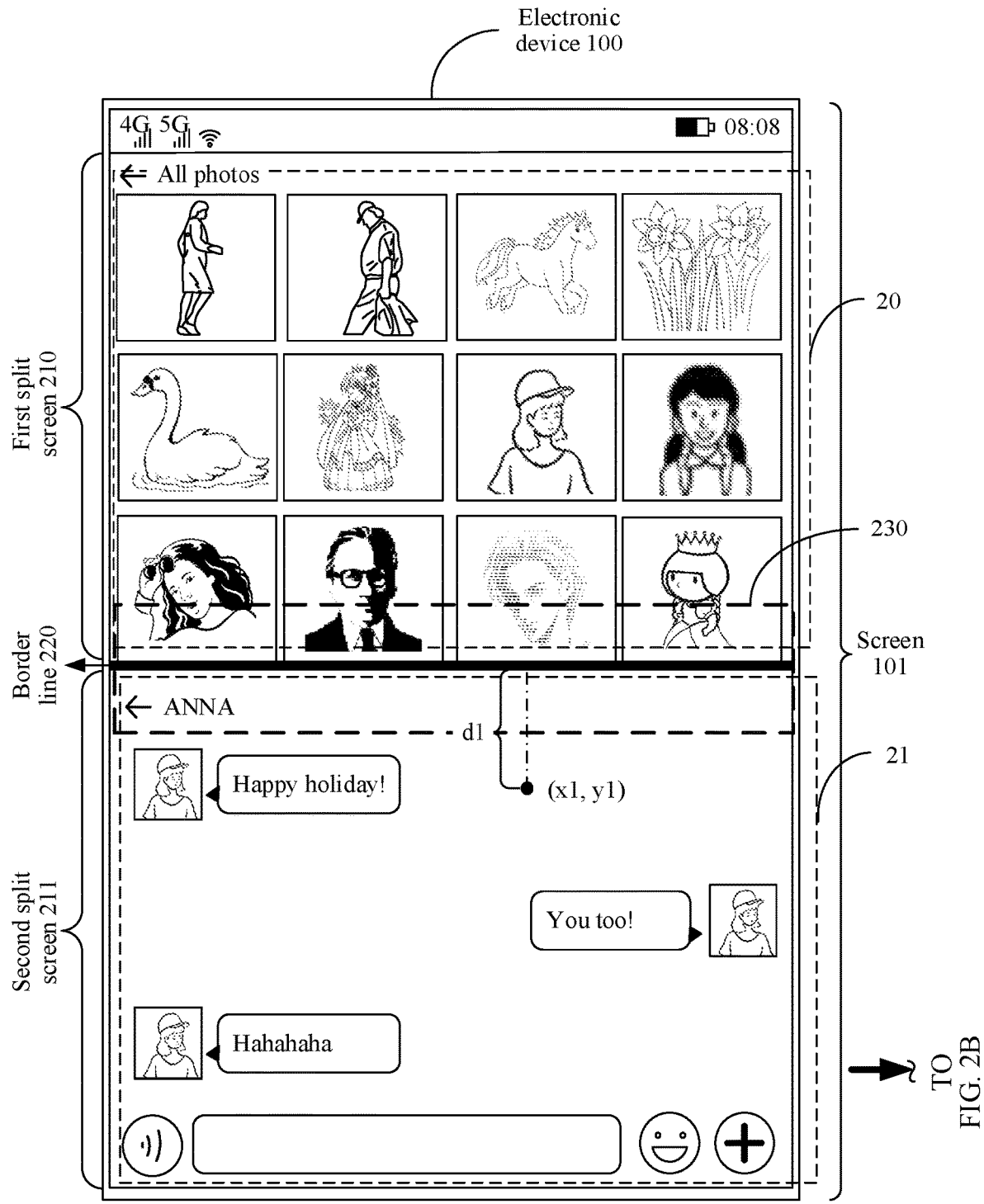
FIG. 2A to FIG. 2C are a schematic diagram of obtaining a screenshot picture according to an embodiment of this application.
Figure 2B:
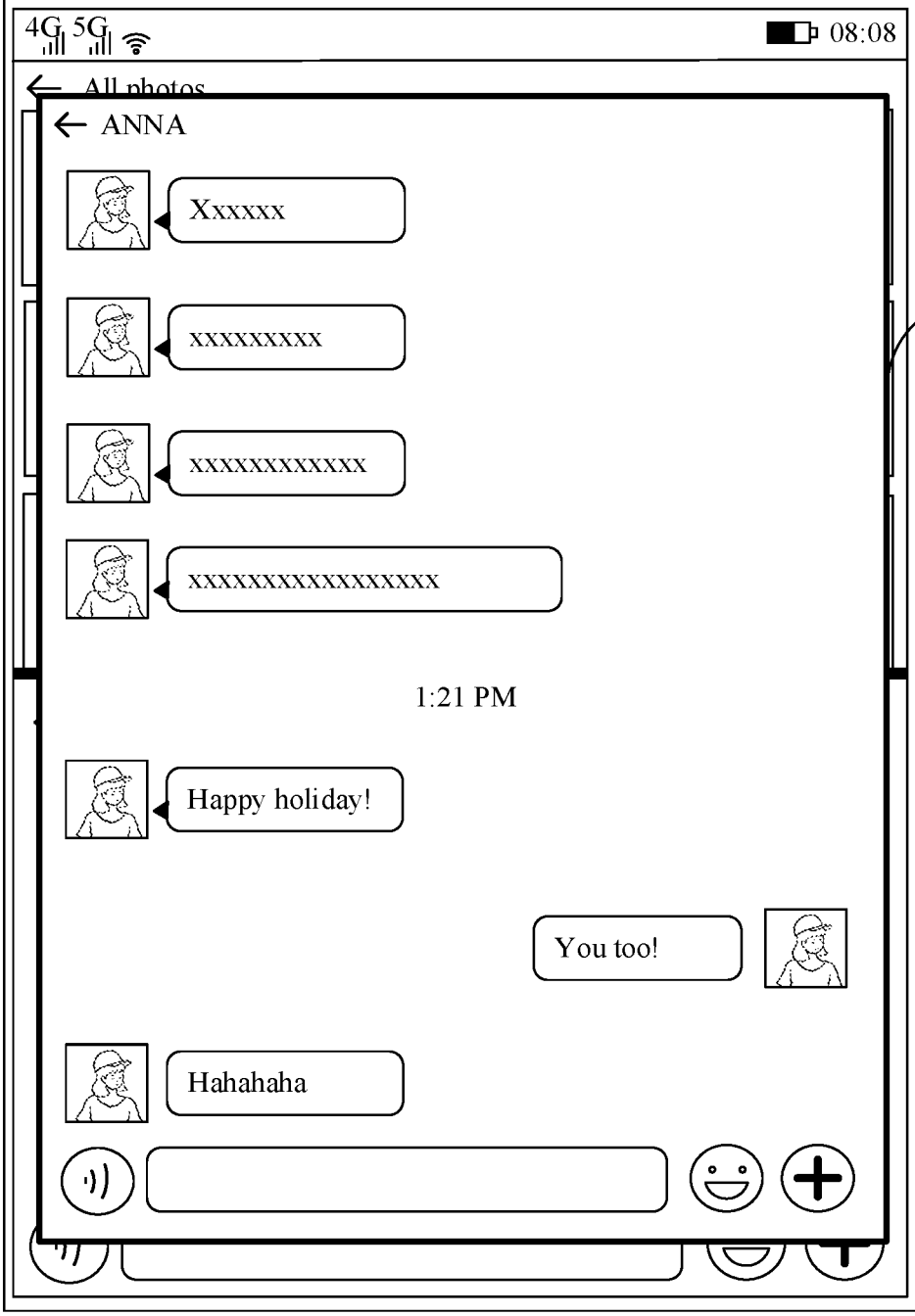
Figure 2C:
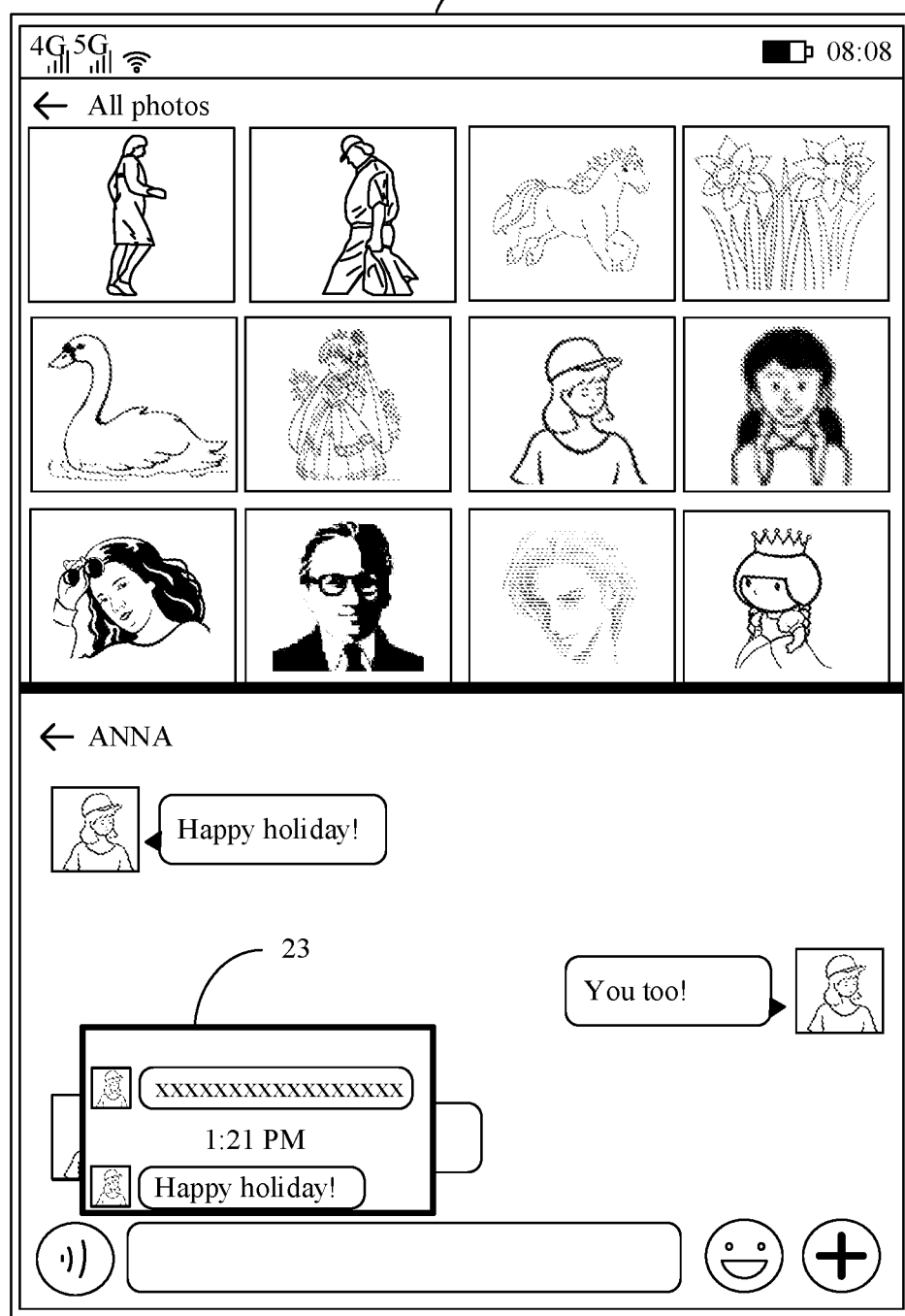

Specifically, FIG. 2A to FIG. 2C are a schematic diagram of obtaining a screenshot picture according to an embodiment of this application. As shown in FIG. 2A, the electronic device displays a first split screen 210 and a second split screen 211 by using the screen 101, the first split screen 210 displays the user interface 20 of the gallery, the second split screen 211 displays the user interface 21 of WeChat, and the first split screen 210 and the second split screen 211 are distinguished by using a border line 220.

In a possible implementation, when the electronic device 100 detects that an input user operation (for example, one knock on a user interface included in the screen 101 by using a finger joint of an index finger or a middle finger) is a screen capturing operation: first, the electronic device 100 obtains a first location at which the screen capturing operation is input, for example, (x1, y1) shown in FIG. 2A. Further, the electronic device 100 may calculate a distance between the first location at which the screen capturing operation is input and each border line, to obtain a first distance set. As shown in FIG. 2A, in this case, there is only one border line 220, and a distance between (x1, y1) and the border line 220 is d1. Then, the electronic device 100 compares a smallest distance in the first distance set with a first threshold, and when the first threshold is greater than the smallest distance, determines that a split screen in which the first location is located is a target split screen. As shown in FIG. 2A, a range included in 230 is a range less than the first threshold. Therefore, the electronic device 100 determines that the second split screen 211 is the target split screen.

It should be understood that the first threshold may be set based on an actual situation, and this is not limited herein.

After determining the target split screen, the electronic device 100 may display, in full screen, an application corresponding to the target split screen, and further save a full-displayed interface of the application corresponding to the target split screen, to obtain a screenshot picture. As shown in FIG. 2B, the electronic device 100 displays, in full screen above a layer in which the first split screen 210 and the second split screen 211 are located, the user interface of WeChat corresponding to the second split screen 211. As shown in FIG. 2B, the user interface 22 of WeChat is obtained after full-screen display. In this case, the gallery application corresponding to the first split screen 210 and the WeChat application corresponding to the second split screen are not closed by the electronic device 100.

Further, the electronic device 100 saves the full-displayed user interface 22 of WeChat, that is, the screenshot picture, recovers the screen split state shown in FIG. 2A, and displays a thumbnail corresponding to the screenshot picture in a floating manner above the layer in which the second split screen 211 is located. As shown in FIG. 2C, the thumbnail 23 corresponding to the screenshot picture is displayed above the second split screen 211 in a floating manner, and the screenshot picture is in a one-to-one correspondence with the thumbnail of the screenshot picture. The electronic device 100 may further set a floating display time of the thumbnail 23, for example, three seconds or five seconds. Within the specified floating display time, the electronic device 100 may receive some specific operations performed by a user on the thumbnail 23, for example, an editing operation (for example, cropping, filtering, or adjustment), and a deletion operation.

Figure 3A:
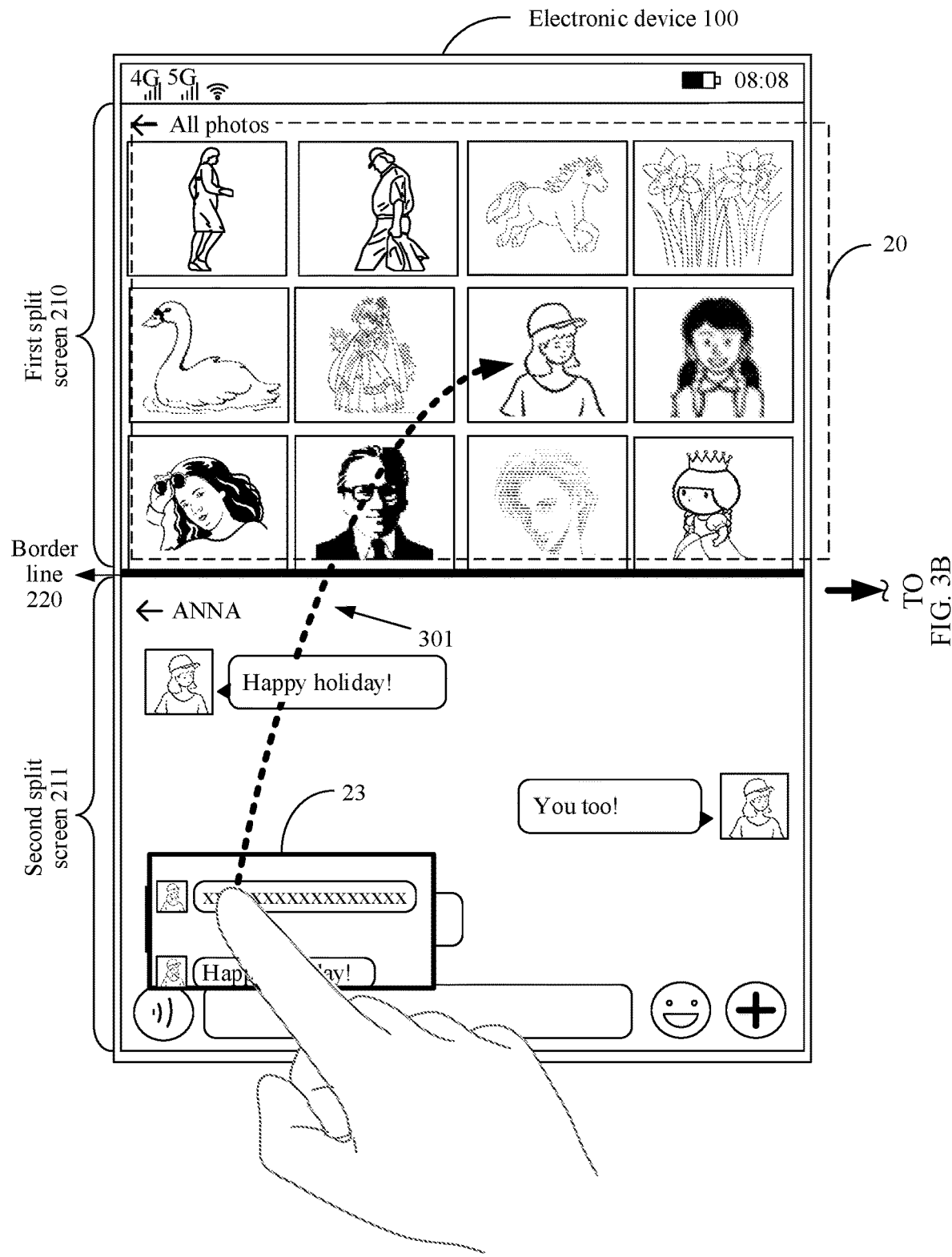
FIG. 3A to FIG. 3C are a schematic diagram of performing a drag operation on a thumbnail corresponding to a screenshot picture according to an embodiment of this application.
Figure 3B:
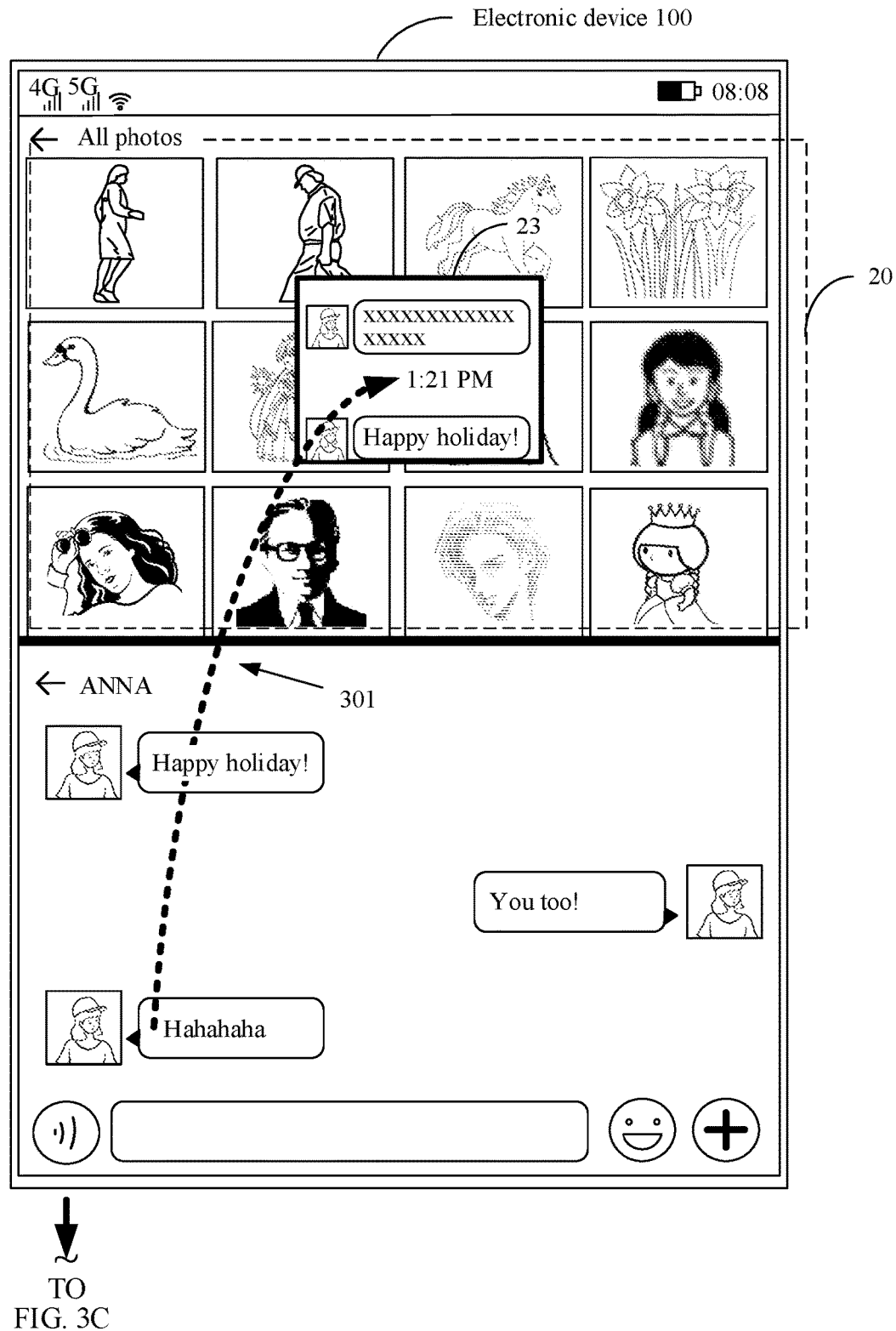
Figure 3C:
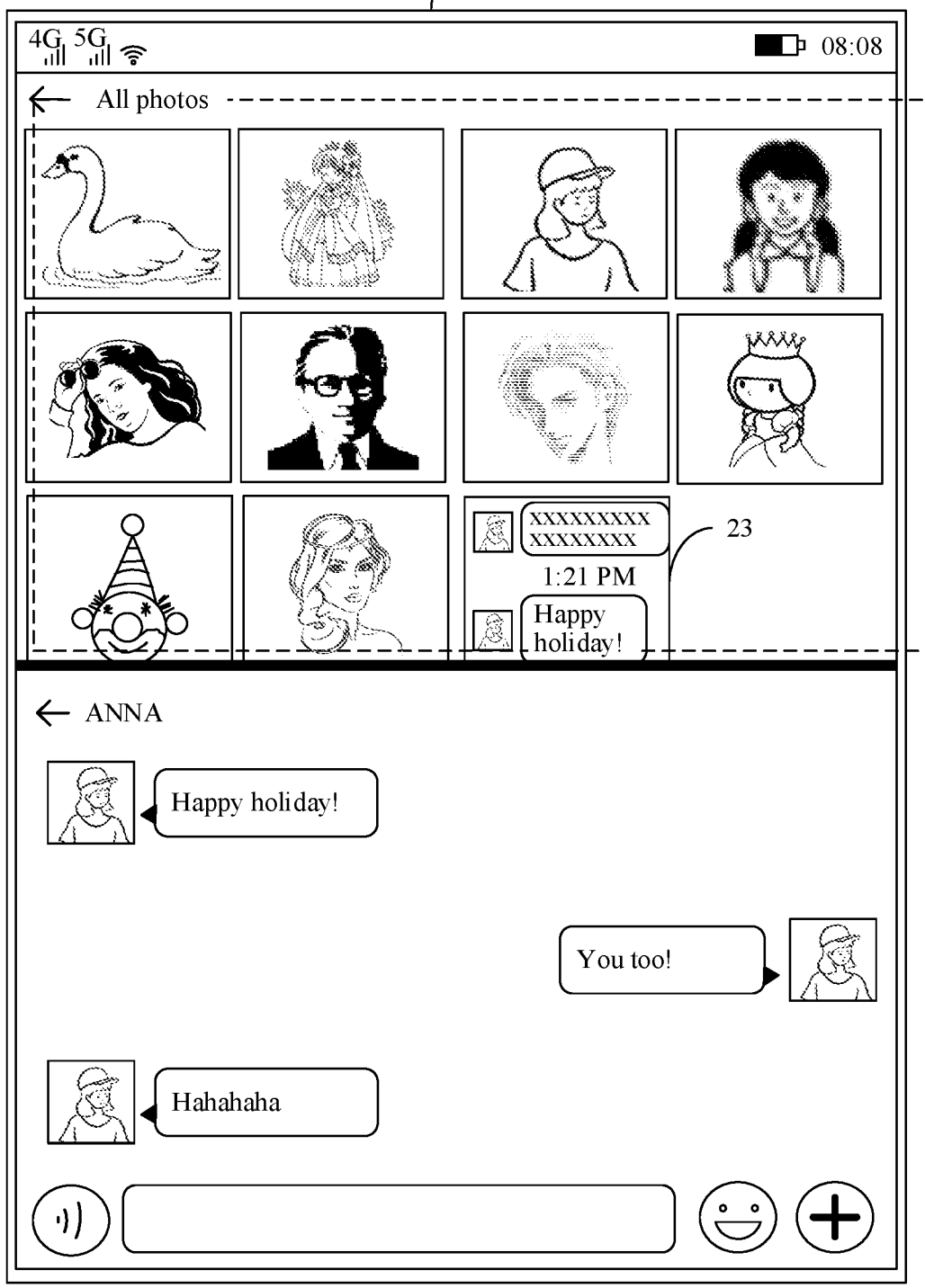

In a possible implementation, as shown in FIG. 2C, after performing a screen capturing operation to obtain the screenshot picture, the electronic device 100 may further respond to a drag operation acting on the thumbnail 23 corresponding to the screenshot picture. FIG. 3A to FIG. 3C are a schematic diagram of performing a drag operation on a thumbnail corresponding to a screenshot picture according to an embodiment of this application. As shown in FIG. 3A, when the user presses and drags the thumbnail 23, the electronic device 100 moves the thumbnail 23 from the second split screen 211 to the first split screen 210 based on a drag track 301 in response to the drag operation on the thumbnail 23 corresponding to the screenshot picture. As shown in FIG. 3B, when the user stops the drag operation, the electronic device 100 detects that the thumbnail 23 is located in the first split screen 210. Further, the electronic device 100 may store the screenshot picture corresponding to the thumbnail 23 in a folder corresponding to "All photos", and display the thumbnail 23 in the first split screen 210, as shown in FIG. 3C. In this case, the second split screen 210 displays a user interface 24 of the gallery.

In a possible implementation, when the smallest distance in the first distance set obtained above is not greater than the first threshold, the electronic device 100 determines that the border line corresponding to the smallest distance is a first border line, and further, the electronic device 100 determines that two split screens distinguished by the first border line are the target split screen.

Figure 4A:
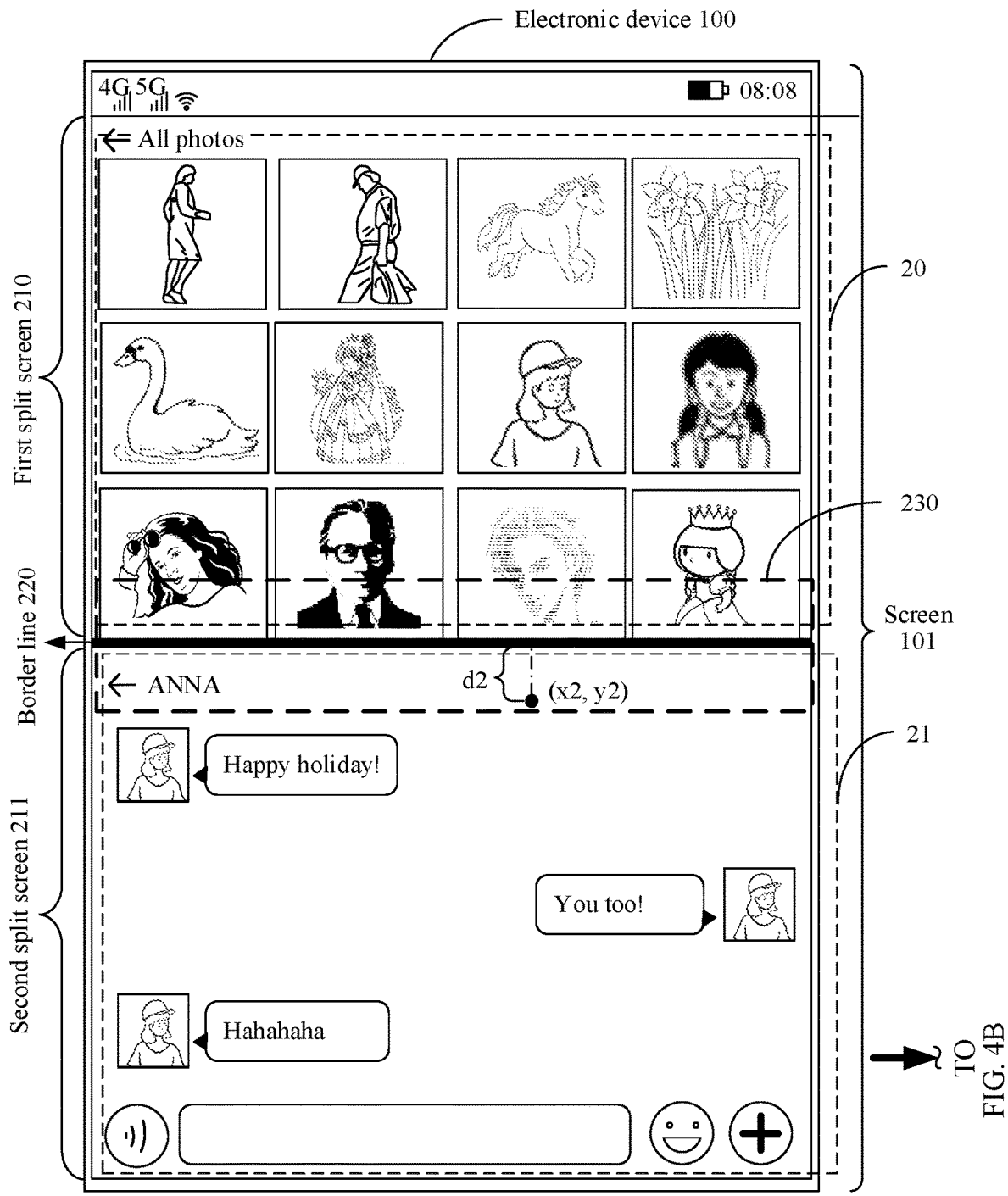
FIG. 4A to FIG. 4D are a schematic diagram of obtaining a screenshot picture according to an embodiment of this application.

Specifically, FIG. 4A to FIG. 4D are a schematic diagram of obtaining a screenshot picture according to an embodiment of this application. As shown in FIG. 4A, a distance between a first location (x2, y2) at which the screen capturing operation is input and the border line 220 is d2, and d2 is less than the first threshold, and is within a range included in 230. Therefore, the electronic device 100 determines that the border line 220 is the first border line, and further, the electronic device 100 determines that the first split screen 210 and the second split screen 211 that are distinguished by the first border line 220 are the target split screen.

Figure 4B:
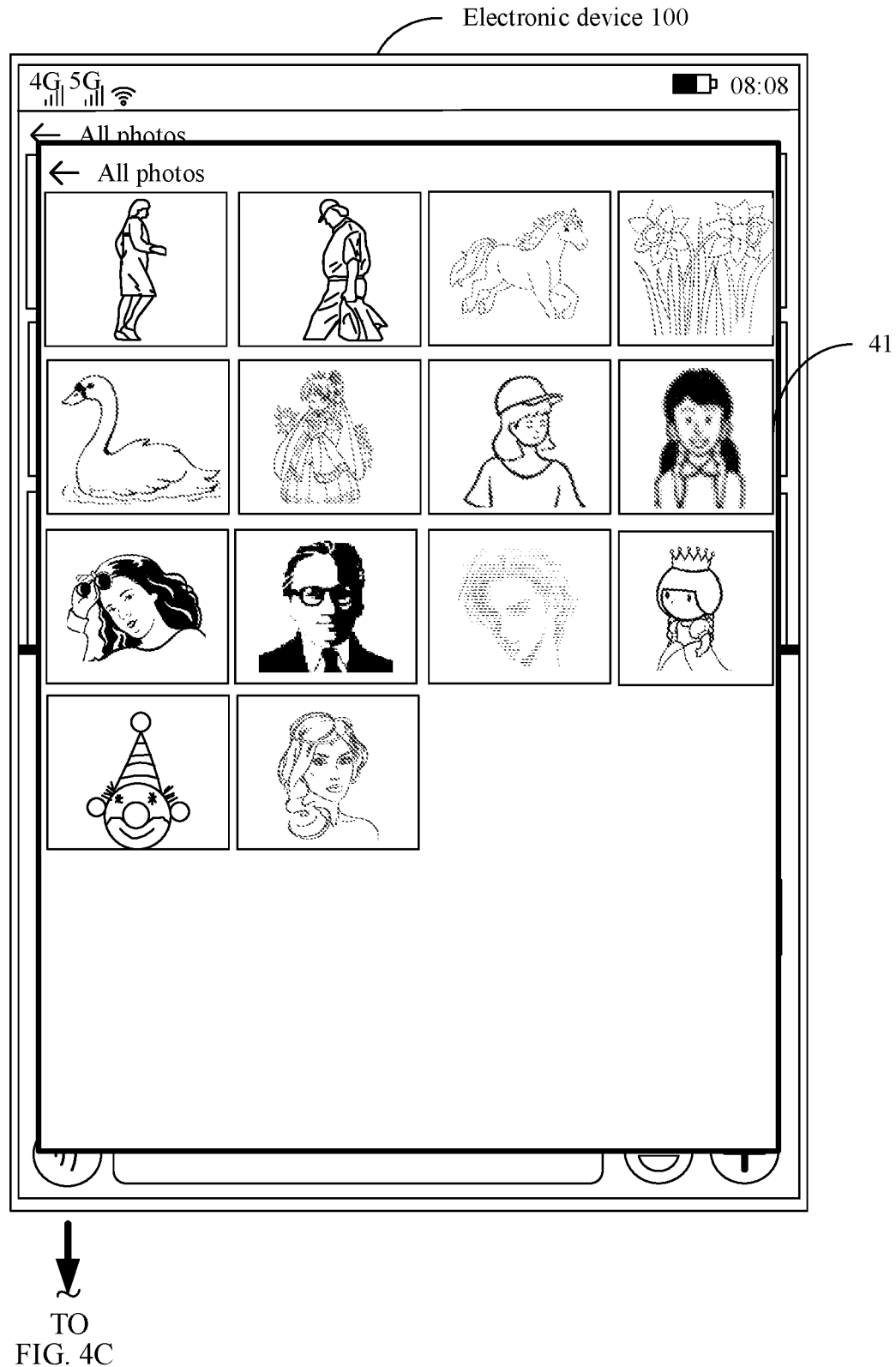
Figure 4C:
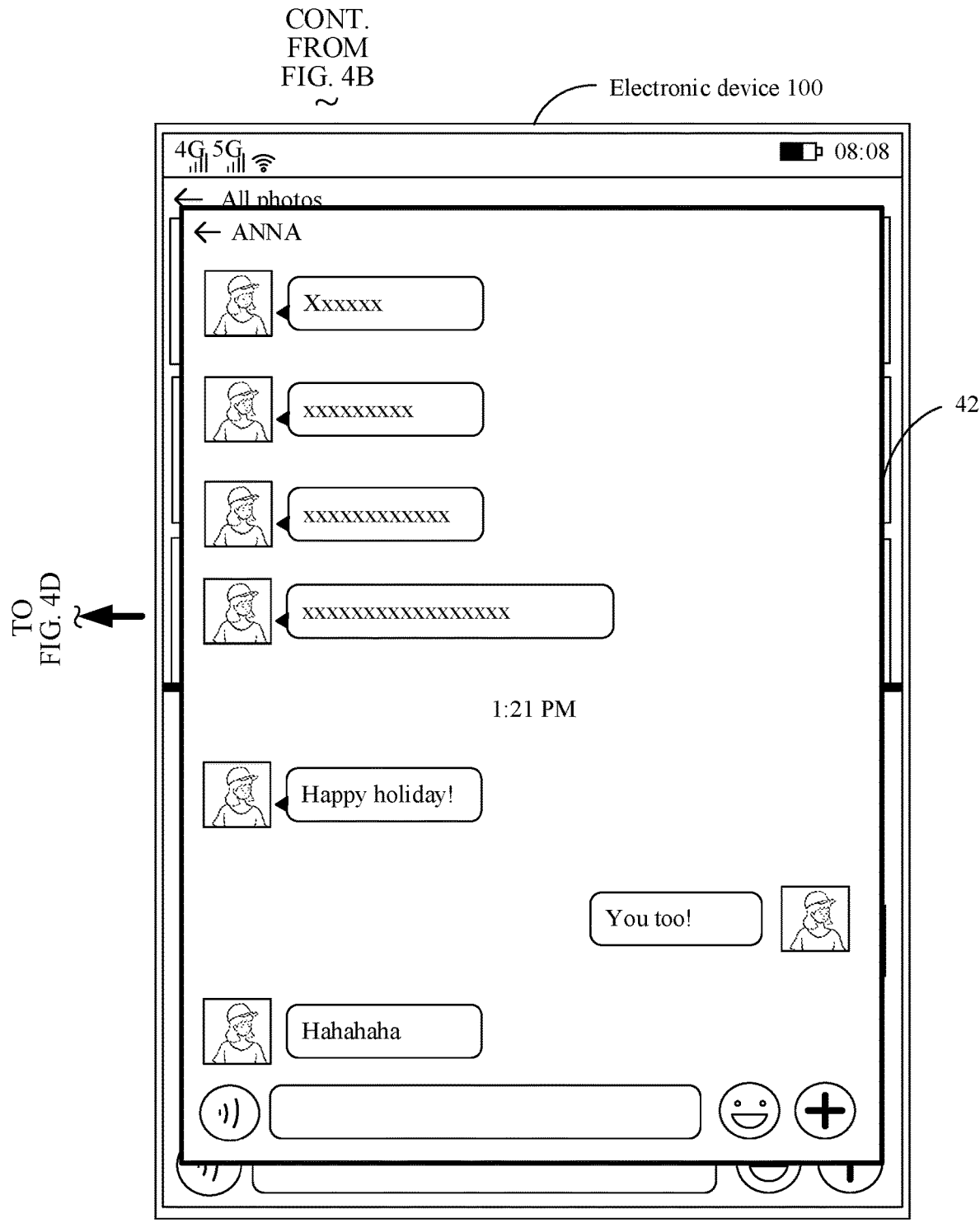
Figure 4D:
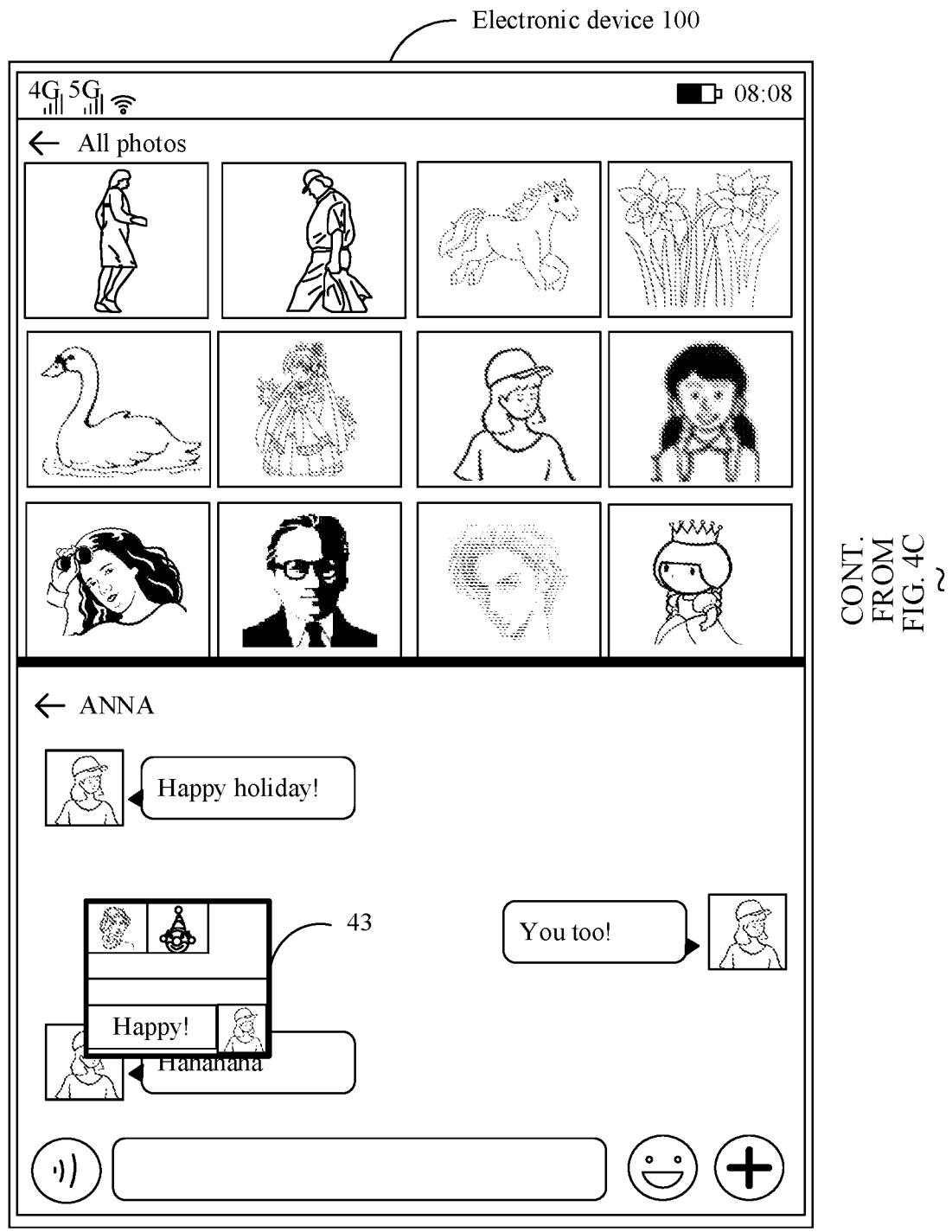

When the target split screen is a plurality of split screens, the electronic device 100 may sequentially display, in full screen, the interface of the application corresponding to each split screen in the target split screen, and further save the full-displayed interface of the application corresponding to each split screen in the target split screen, and then the electronic device 100 splices the full-displayed interface of the application corresponding to each split screen in the target split screen, to obtain the screenshot picture. As shown in FIG. 4B, the electronic device displays, in full screen above the layer in which the first split screen 210 and the second split screen 211 are displayed, the gallery application corresponding to the first split screen 210, to save and obtain a full-displayed user interface 41 of the gallery. Then, as shown in FIG. 4C, the electronic device 100 displays, in full screen above the layer in which the first split screen 210 and the second split screen 211 are displayed, the WeChat application corresponding to the second split screen 211, to save and obtain a full-displayed user interface 42 of WeChat. Further, the electronic device 100 splices the user interface 41 and the user interface 42 to obtain the screenshot picture. Finally, the electronic device 100 recovers the screen split state, and displays the thumbnail of the screenshot picture above the layer in which the screen split state is displayed. As shown in FIG. 4D, a thumbnail 43 of the screenshot picture is displayed above the second split screen 211 in a floating manner.

Figure 4E:
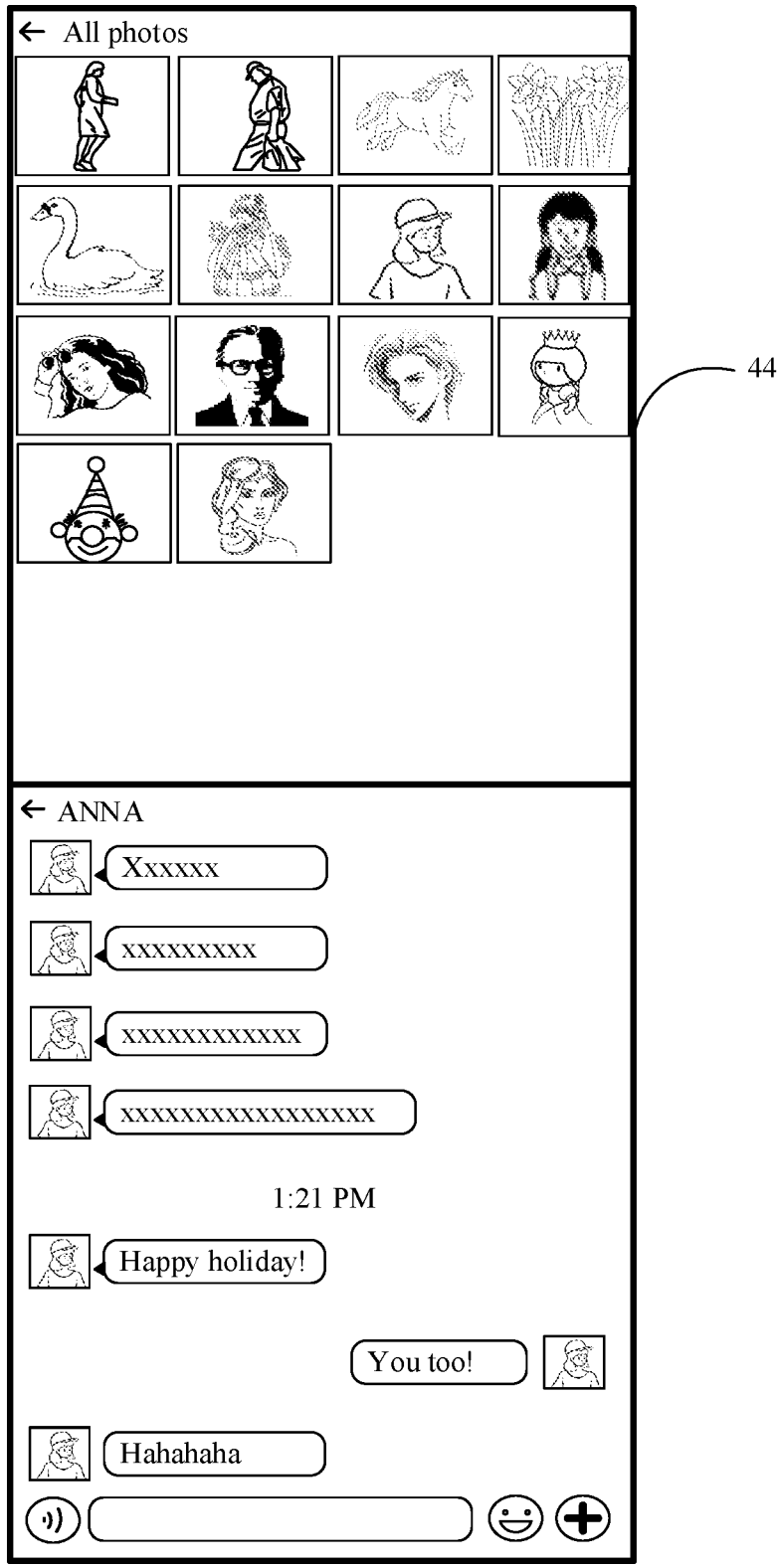
FIG. 4E is a schematic diagram of obtaining a screenshot picture through splicing according to an embodiment of this application.

FIG. 4E is a schematic diagram of obtaining a screenshot picture through splicing according to an embodiment of this application. As shown in FIG. 4E, the screenshot picture 44 includes the full-displayed user interface 41 of the gallery on the electronic device 100, and the full-displayed user interface 42 of WeChat on the electronic device 100.

It should be understood that a manner in which the electronic device 100 splices the full-displayed interface of the user interface corresponding to each split screen in the target split screen is not limited to the foregoing form shown in FIG. 4E. FIG. 4E is merely an example description of this application, and should not constitute a limitation on this application.

Figure 4F:
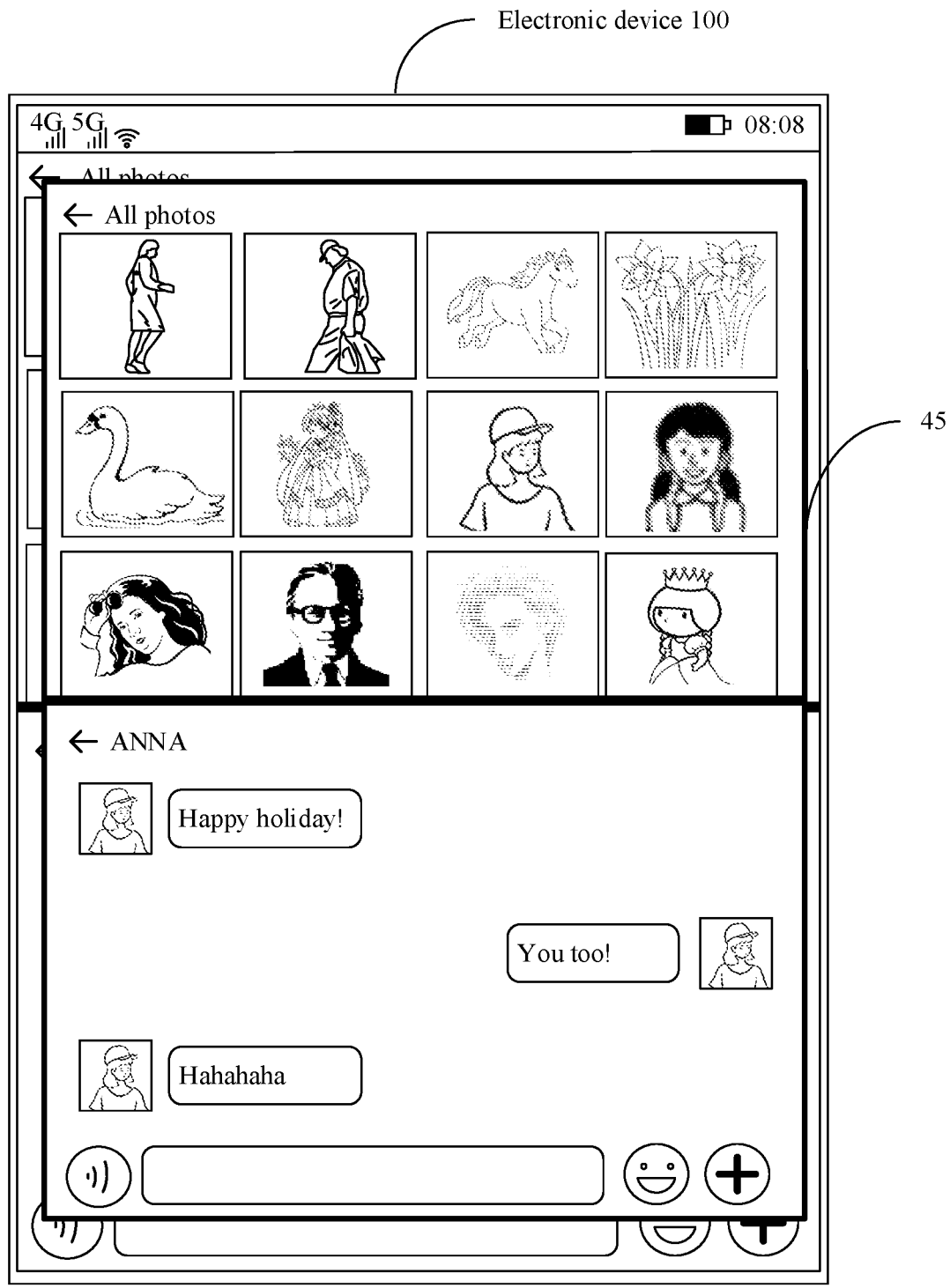
FIG. 4F is another schematic diagram of obtaining a screenshot picture according to an embodiment of this application.

In a possible implementation, after obtaining the target split screen, the electronic device may further directly perform the screen capturing operation, to obtain the screenshot picture. In this case, the screenshot picture includes an interface of an application displayed by each split screen in the target split screen in the screen split state. Specifically, FIG. 4F is another schematic diagram of obtaining a screenshot picture according to an embodiment of this application. After determining, in the manner described above, that the first split screen 210 and the second split screen 211 that are distinguished by the first border line 220 are the target split screen, the electronic device 100 may further directly respond to the screen capturing operation in the screen split state to obtain a screenshot picture 45. As shown in FIG. 4F, the screenshot picture 45 includes the user interface 20 of the gallery displayed by the first split screen 210 and the user interface 21 of WeChat displayed by the second split screen 211 in the screen split state.

With reference to the foregoing description, the electronic device 100 may further respond to a drag operation acting on the thumbnail 43 corresponding to the screenshot picture, and when the drag operation disappears, the electronic device 100 performs a corresponding operation on the thumbnail 43 and the screenshot picture corresponding to the thumbnail 43. For example, when the drag operation disappears, the electronic device 100 detects that the application corresponding to the split screen in which the thumbnail 43 is located is a chat window. In this case, the electronic device 100 may automatically send, in the chat window, the screenshot picture 44 corresponding to the thumbnail 43.

Figure 5:
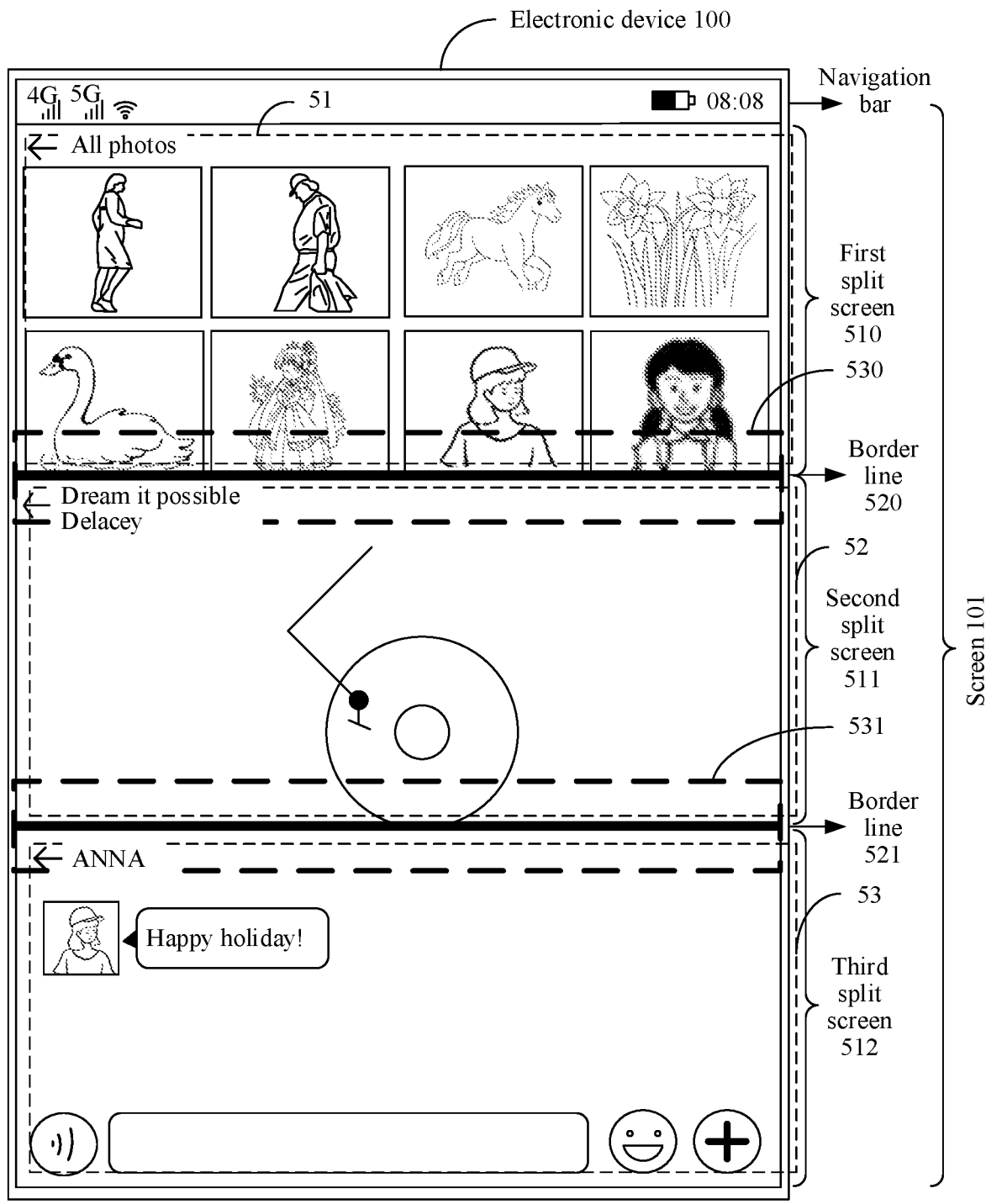
FIG. 5 is a schematic diagram of a user interface according to an embodiment of this application.

In a possible implementation, the electronic device 100 may further include three split screens. FIG. 5 is a schematic diagram of a user interface according to an embodiment of this application. As shown in FIG. 5, the electronic device 100 displays three split screens by using the screen 101, which are respectively a first split screen 510, a second split screen 511, and a third split screen 512. The first split screen 510 displays a user interface 51 of the gallery, the second split screen 511 displays a user interface 52 of NetEase Cloud, and the third split screen 512 displays a user interface 53 of WeChat. The first split screen 510 and the second split screen 511 are distinguished by using a border line 520, and the second split screen 511 and the third split screen 512 are distinguished by using a border line 521. With reference to the foregoing description in FIG. 2A to FIG. 2C, the electronic device 100 may receive an input screen capturing operation, and further, in response to the screen capturing operation, obtain the screenshot picture corresponding to the screen capturing operation. As shown in FIG. 5, for example, when determining, based on the first location at which the screen capturing operation is input, that the border line 520 is the first border line, and when detecting that the first location is located within a range included in 530, the electronic device 100 determines that the first split screen 510 and the second split screen 511 that are distinguished by the first border line are the target split screen. For a specific implementation in which the electronic device 100 obtains the target split screen, refer to the specific description in FIG. 2A to FIG. 2C. Details are not described herein again.

In addition, for a specific implementation in which the electronic device 100 performs the screen capturing operation on the target split screen to obtain the screenshot picture after obtaining the target split screen, refer to the foregoing specific description in FIG. 2A to FIG. 2C, and FIG. 4A to FIG. 4F. Details are not described herein again.

In a possible implementation, the border lines that distinguish split screens form at least one intersection point, as shown in FIG. 1B or FIG. 1C. In this case, an implementation in which the electronic device 100 obtains the target split screen is related to the at least one intersection point. For example, for a form in which the three split screens in FIG. 1B form one intersection point 130, refer to the following related description of obtaining the target split screen in FIG. 6A to FIG. 6C for an implementation of obtaining the target split screen.

Figure 6A:
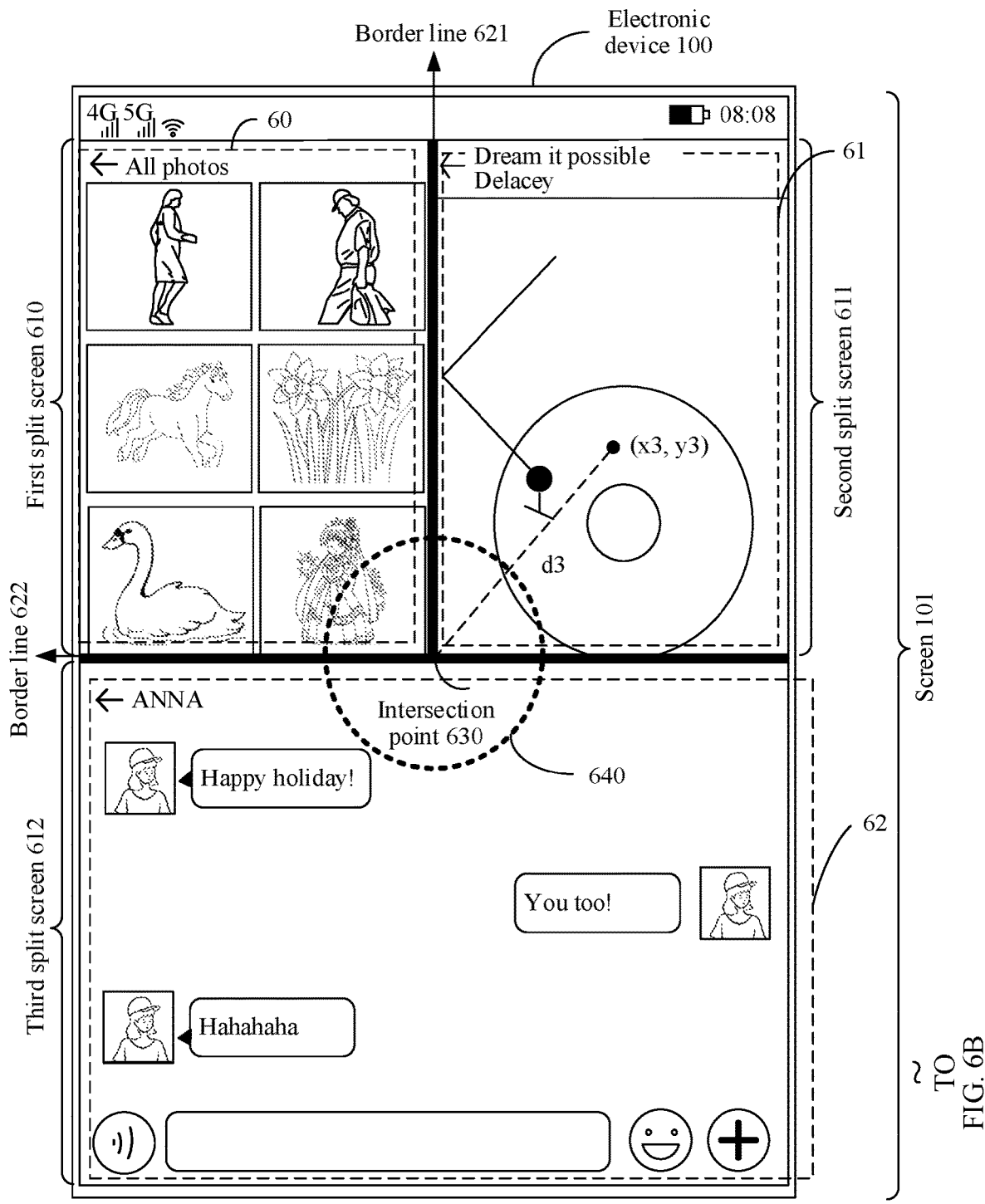
FIG. 6A to FIG. 6C show an implementation of obtaining a target split screen according to an embodiment of this application.
Figure 6B:
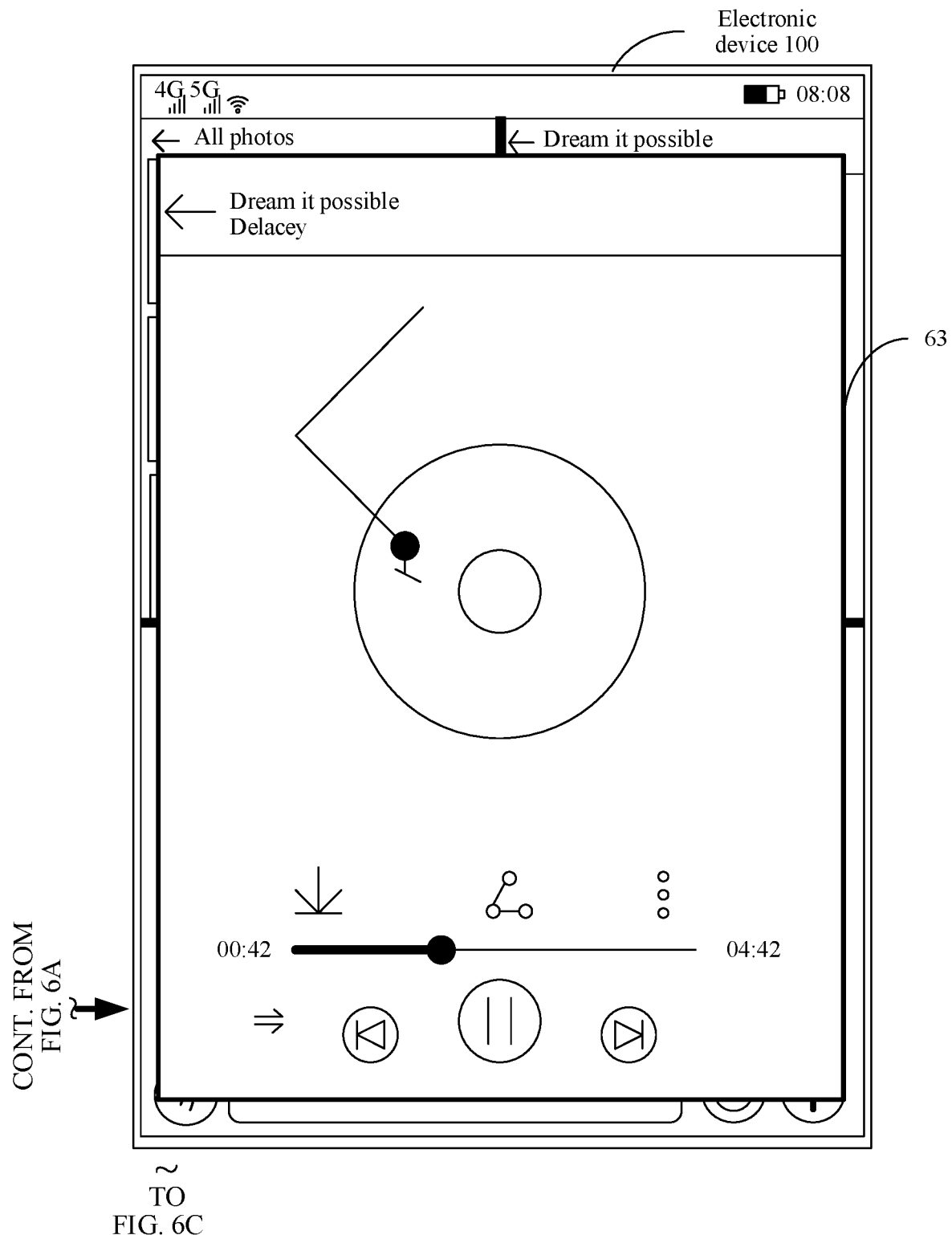
Figure 6C:
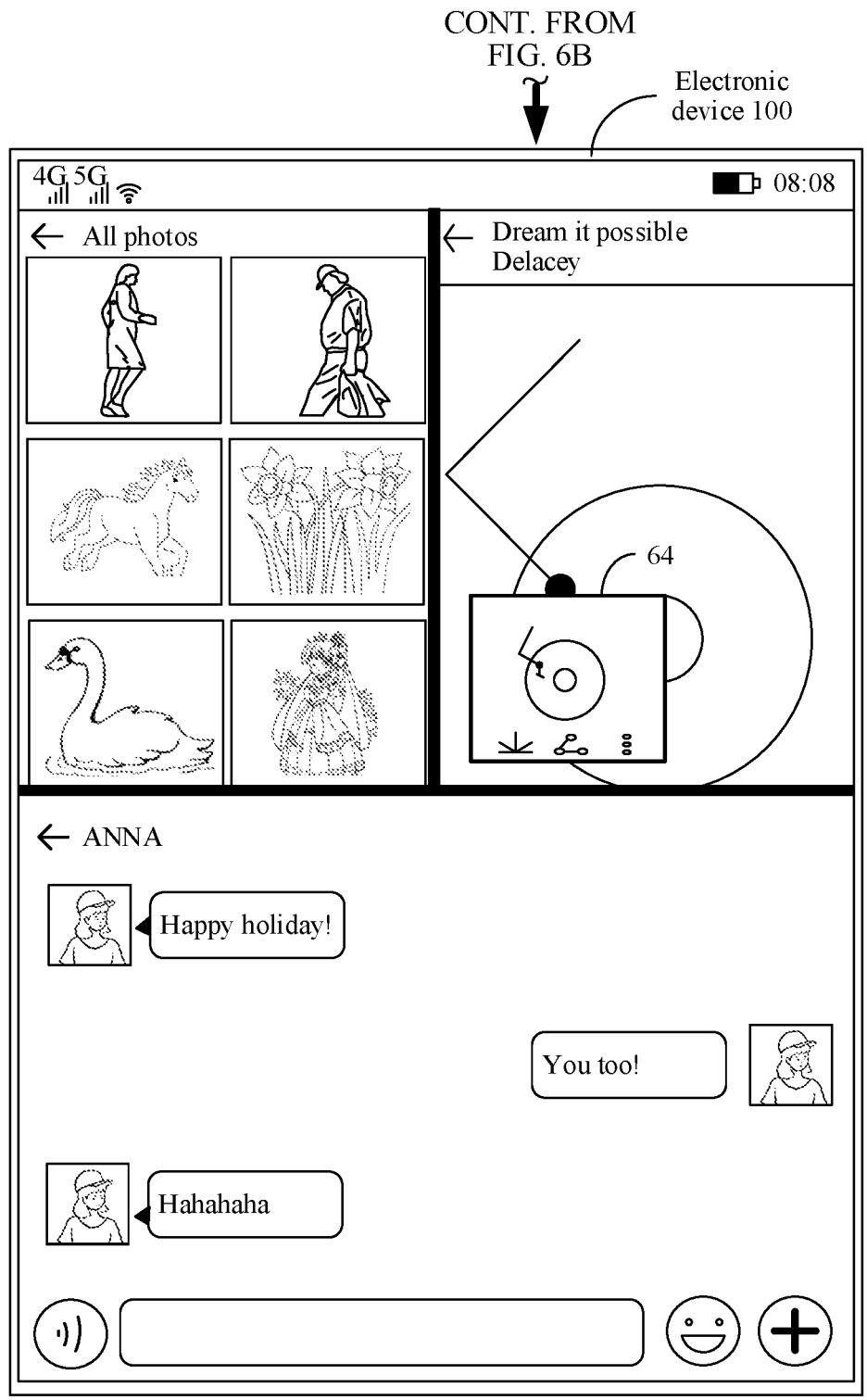

FIG. 6A to FIG. 6C show an implementation of obtaining a target split screen according to an embodiment of this application. As shown in FIG. 6A, the electronic device 100 displays three split screens by using the screen 101, which are respectively a first split screen 610, a second split screen 611, and a third split screen 612. The first split screen 610 displays a user interface 60 of the gallery, the second split screen 611 displays a user interface 61 of NetEase CloudMusic, and the third split screen 612 displays a user interface 62 of WeChat. The first split screen 610 is distinguished from other split screens by using a border line 621 and a border line 622, the second split screen 611 is distinguished from other split screens by using the border line 621 and the border line 622, and the third split screen 612 is distinguished from other split screens by using the border line 622. The border line 621 intersects with the border line 622 to form one intersection point 630.

When the electronic device 100 detects that the input user operation is the screen capturing operation, the electronic device 100 responds to the screen capturing operation, and obtains the target split screen corresponding to the screen capturing operation. Specifically, as shown in FIG. 6A, when the electronic device 100 detects that the input user operation (for example, one knock on a user interface included in the screen 101 by using a finger joint of an index finger or a middle finger) is the screen capturing operation: first, the electronic device 100 obtains the first location at which the screen capturing operation is input, for example, (x3, y3) shown in FIG. 6A. Further, the electronic device 100 may calculate a distance between the first location at which the screen capturing operation is input and each of the at least one intersection point, to obtain a second distance set. As shown in FIG. 6A, the distance between (x3, y3) and the intersection point 630 is d3. In this case, there is only one intersection point 630. Therefore, the electronic device 100 determines that the intersection point 630 is the target intersection point. Then, the electronic device 100 forms a first range (640 in this case) by using the target intersection point as a circle center and using R as a radius. Further, the electronic device 100 determines whether the first location is within the first range. When the electronic device 100 determines that the first location is not within the first range, the electronic device 100 determines that a split screen to which the first location belongs is the target split screen. For example, as shown in FIG. 6A, (x3, y3) is not within the range 640, and the electronic device 100 determines that the second split screen 611 to which (x3, y3) belongs is the target split screen.

After obtaining the target split screen, the electronic device 100 displays, in full screen, the application corresponding to the target split screen. As shown in FIG. 6B, the electronic device 100 displays, in full screen above the layer in which the screen split state shown in FIG. 6A is displayed, the user interface 63 of NetEase CloudMusic corresponding to the second split screen 611. The full-displayed user interface 63 of NetEase CloudMusic may display more content than the user interface 61 in the screen split state. For example, as shown in FIG. 6B, the user interface 63 may display a download control, a share control, a comment control, a music playing progress control, a song switching control, a pause/play control, a play mode control, and the like. Further, the electronic device 100 saves the user interface 63, and displays, above the second split screen 611 in a floating manner, a thumbnail 64 corresponding to the user interface 63, as shown in FIG. 6C.

Figure 7A:
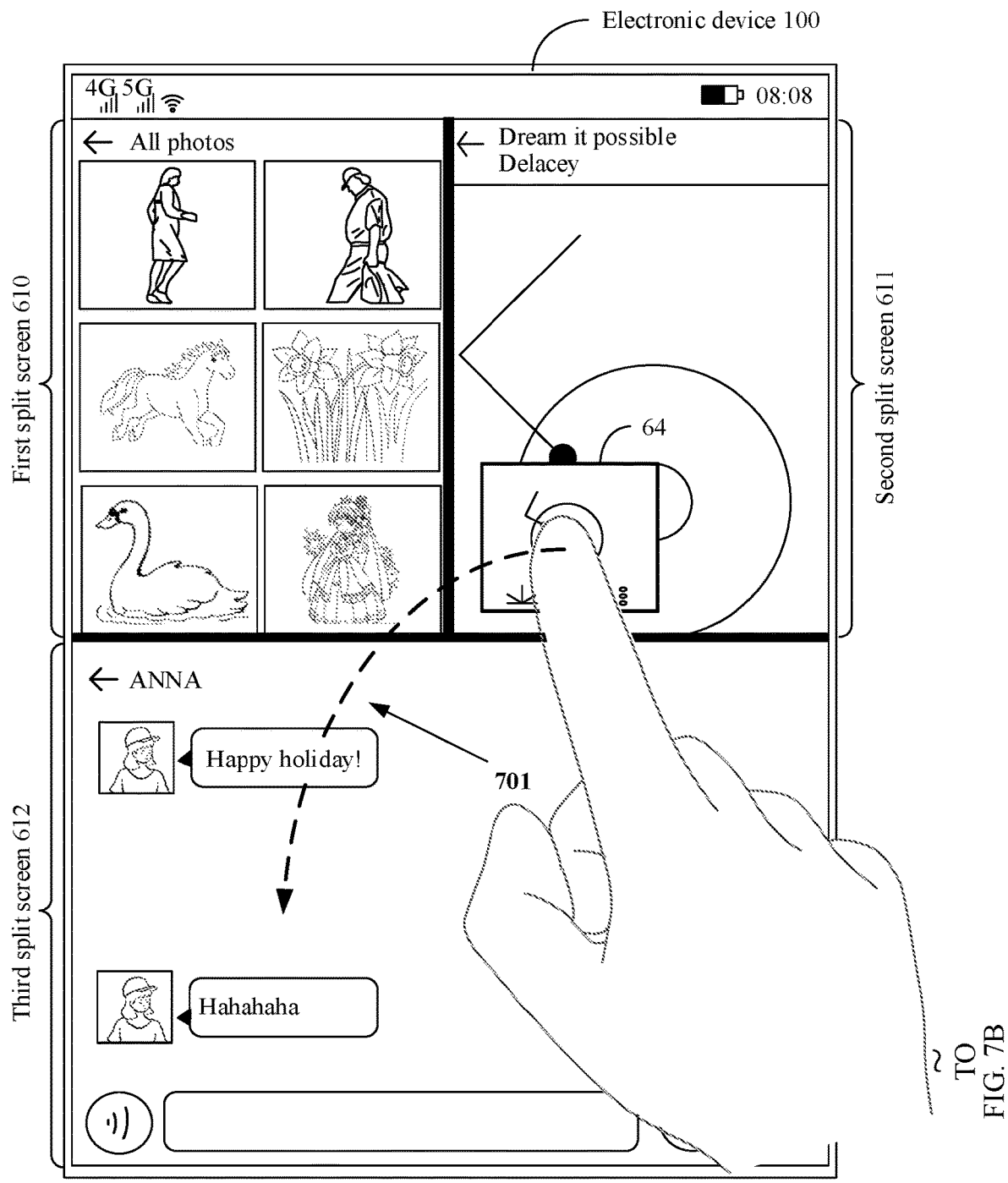
FIG. 7A to FIG. 7C are a schematic diagram of performing a drag operation on a thumbnail corresponding to a screenshot picture according to an embodiment of this application.
Figure 7B:
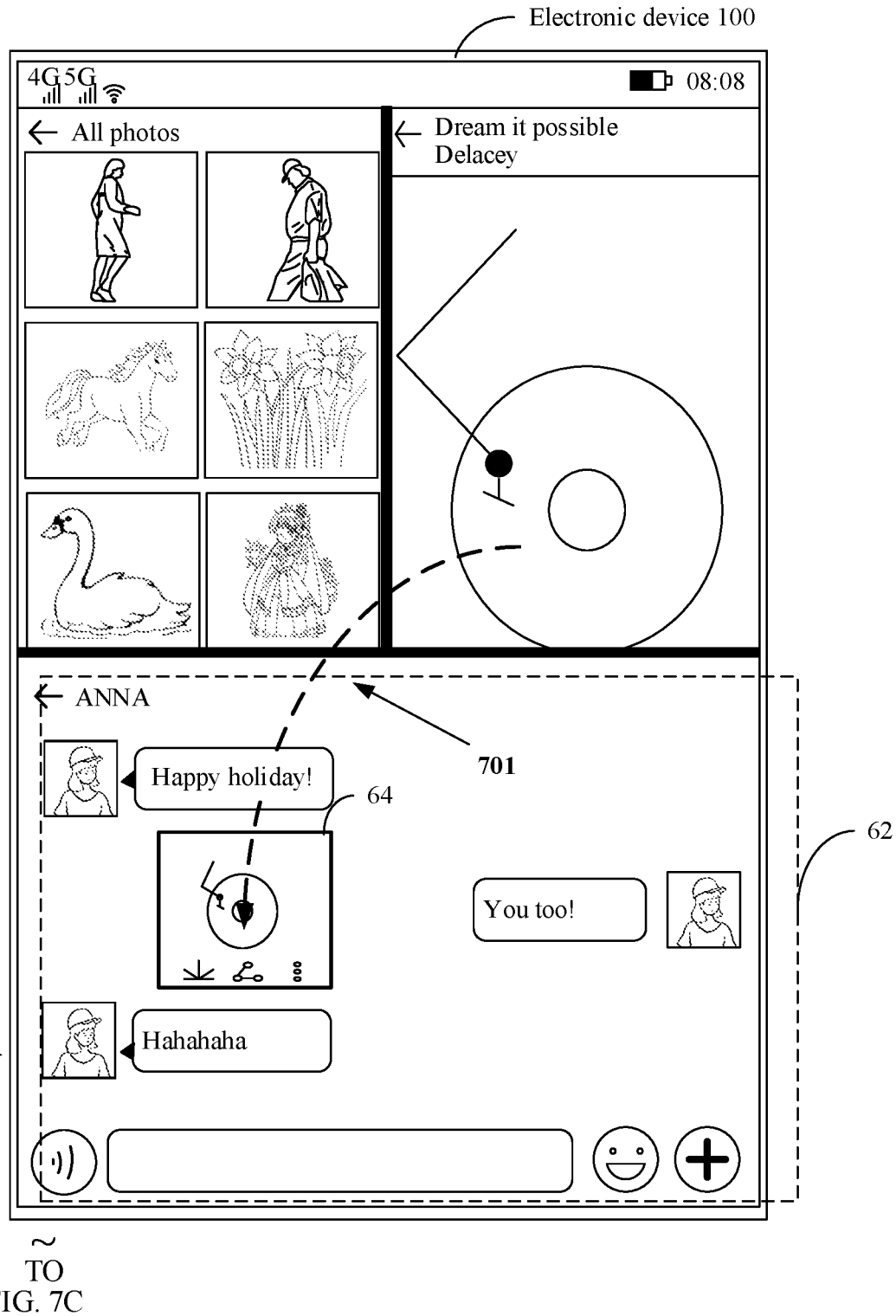
Figure 7C:
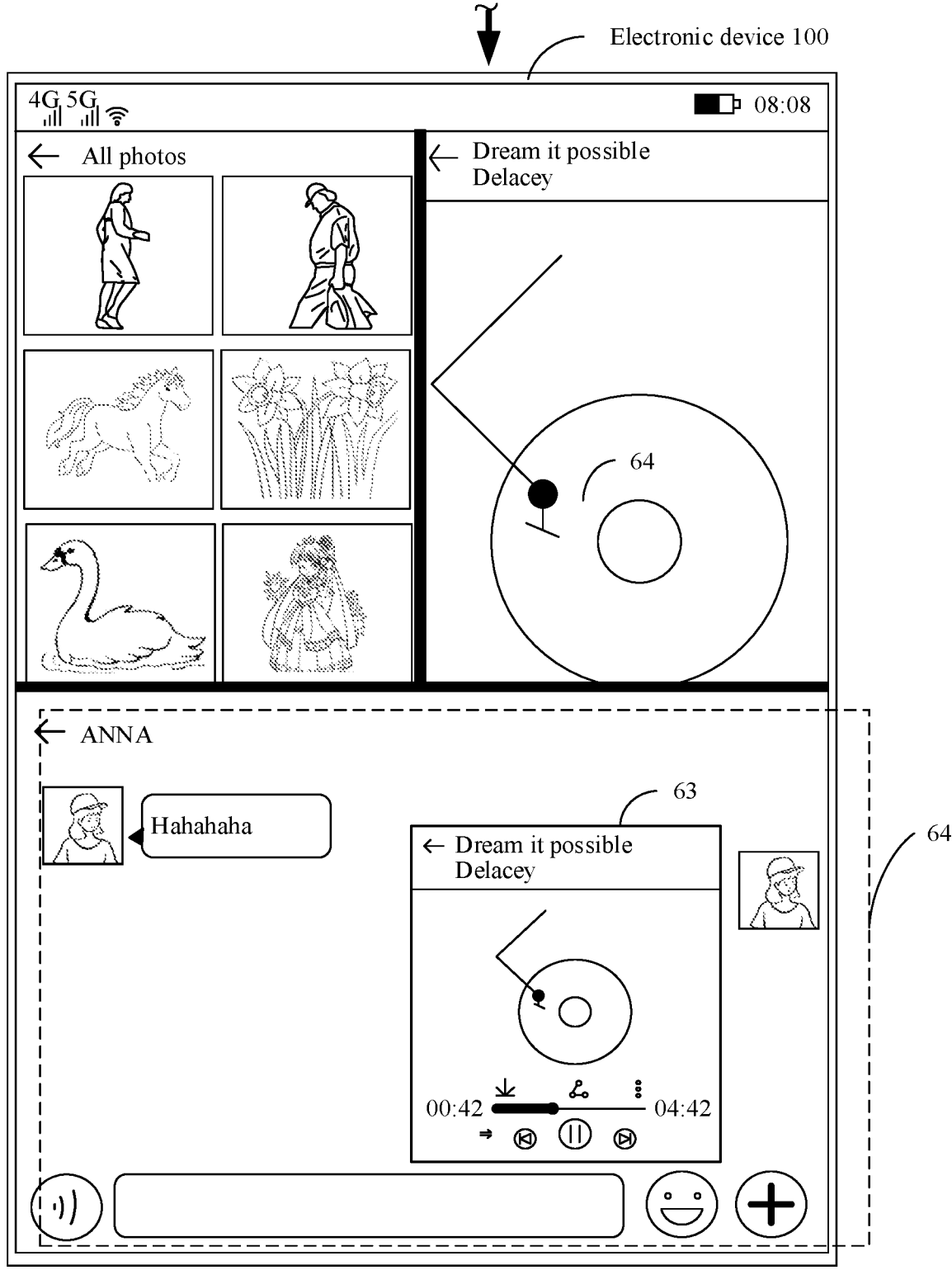

In a possible implementation, as shown in FIG. 6C, after performing the screen capturing operation to obtain the screenshot picture, the electronic device 100 may further respond to a drag operation acting on the thumbnail 64 corresponding to the screenshot picture. FIG. 7A to FIG. 7C are a schematic diagram of performing a drag operation on a thumbnail corresponding to a screenshot picture according to an embodiment of this application. As shown in FIG. 7A, when the user presses and drags the thumbnail 64, the electronic device 100 moves the thumbnail 64 from the second split screen 611 to the third split screen 612 based on a drag track 701 in response to a drag operation on the thumbnail 64 corresponding to the screenshot picture. As shown in FIG. 7B, when the user stops the drag operation, the electronic device 100 detects that the thumbnail 64 is located in the third split screen 612. Further, the electronic device 100 may automatically send, in a chat window displayed in the third split screen 612, the screenshot picture 63 corresponding to the thumbnail 64, as shown in FIG. 7C. In this case, the electronic device 100 displays the user interface 64 of WeChat.

In a possible implementation, after determining the first range based on the target intersection point corresponding to a smallest distance in the second distance set, the electronic device 100 detects that the first location at which the screen capturing operation is input is within the first range. In this case, the electronic device 100 determines that a split screen adjacent to the target intersection point is the target split screen.

Figure 8A:
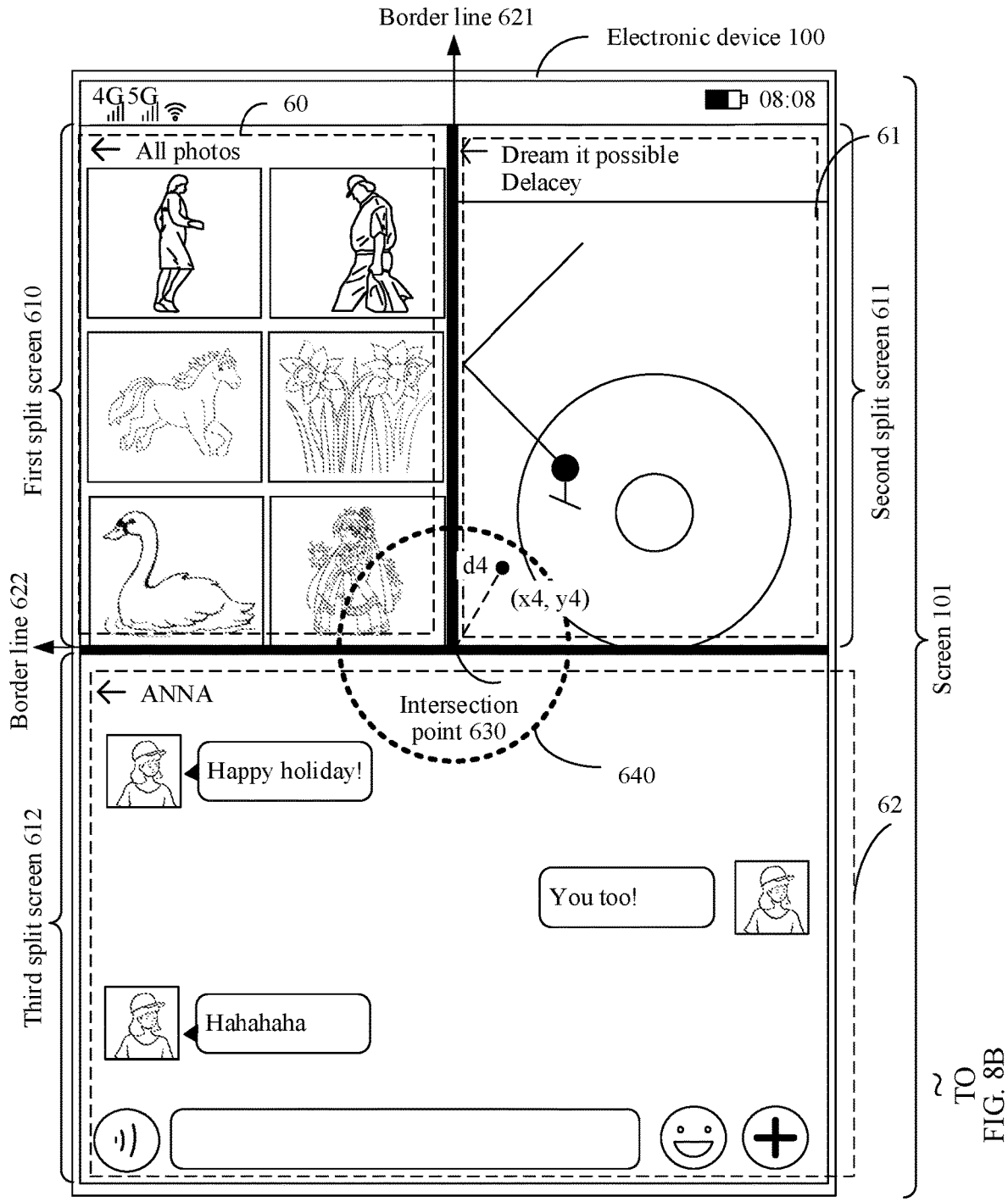
FIG. 8A to FIG. 8E are still another schematic diagram of obtaining a screenshot picture according to an embodiment of this application.

Specifically, FIG. 8A to FIG. 8E are still another schematic diagram of obtaining a screenshot picture according to an embodiment of this application. As shown in FIG. 8A, the intersection point 630 is the target intersection point, the first range determined by the electronic device based on the target intersection point is 640, and the first location (x4, y4) at which the screen capturing operation is input is within the first range 640. Therefore, the electronic device 100 determines that the target split screen is the first split screen 610, the second split screen 611, and the third split screen 612 that are adjacent to the intersection point 630.

Figure 8B:
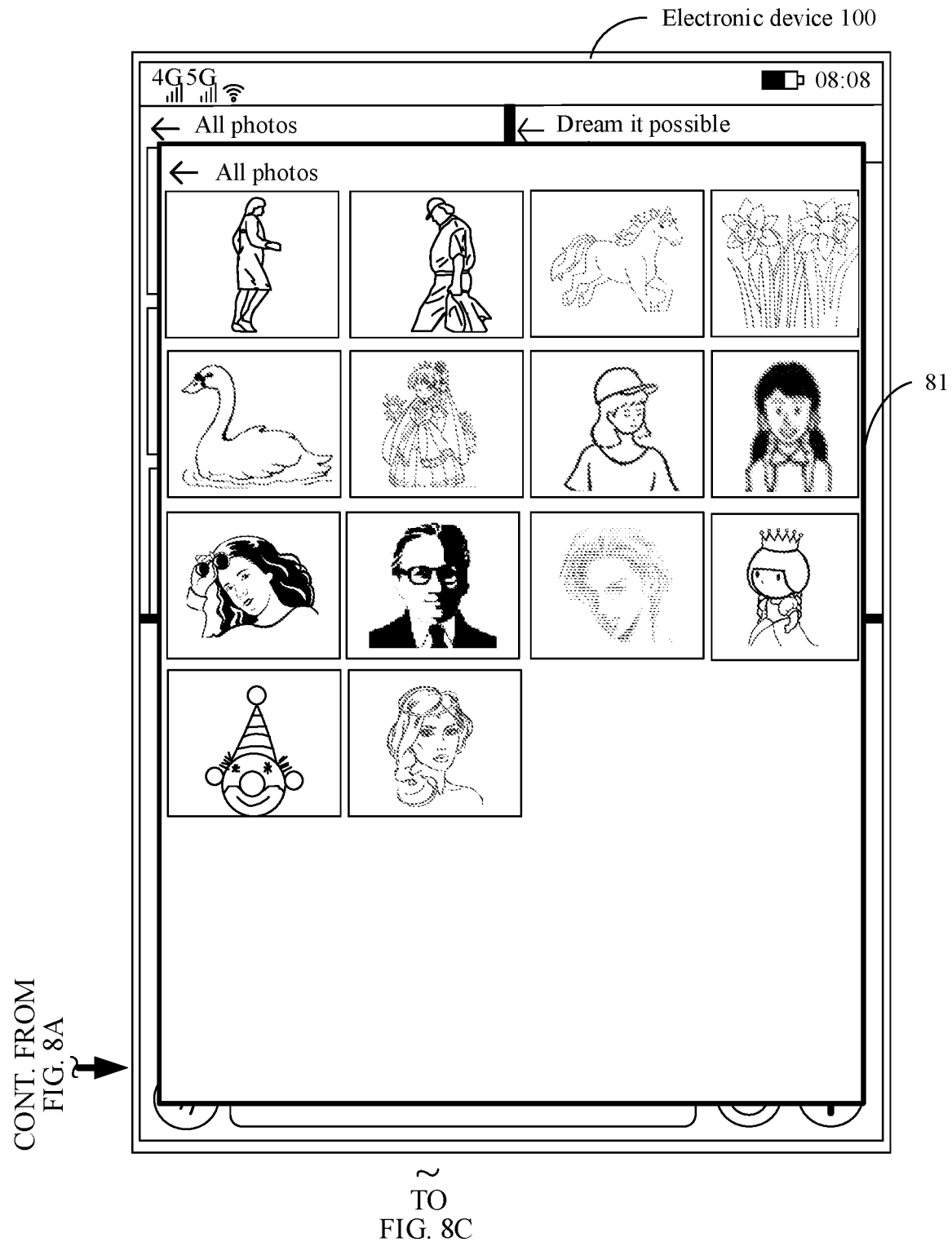
Figure 8C:
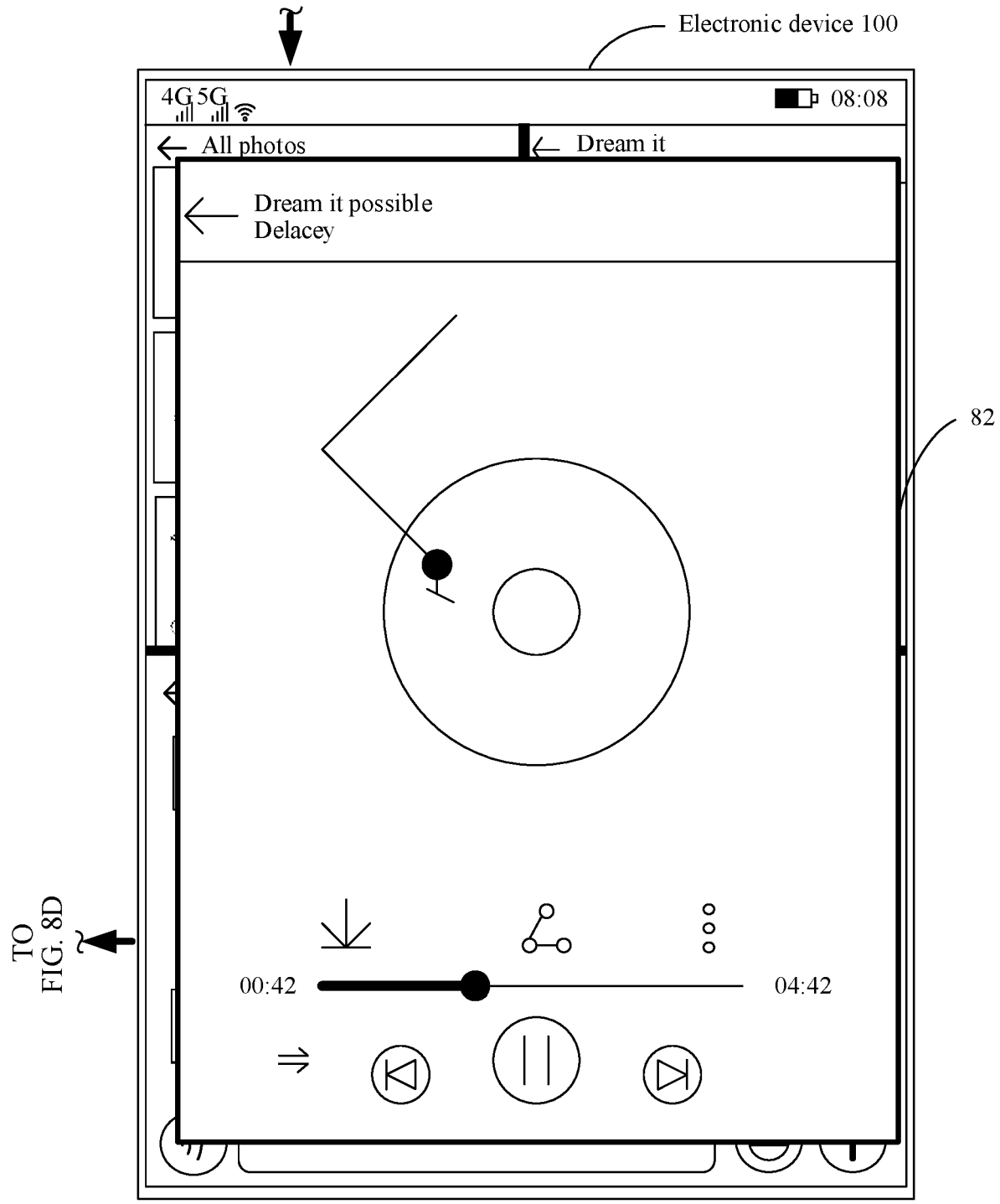
Figure 8D:
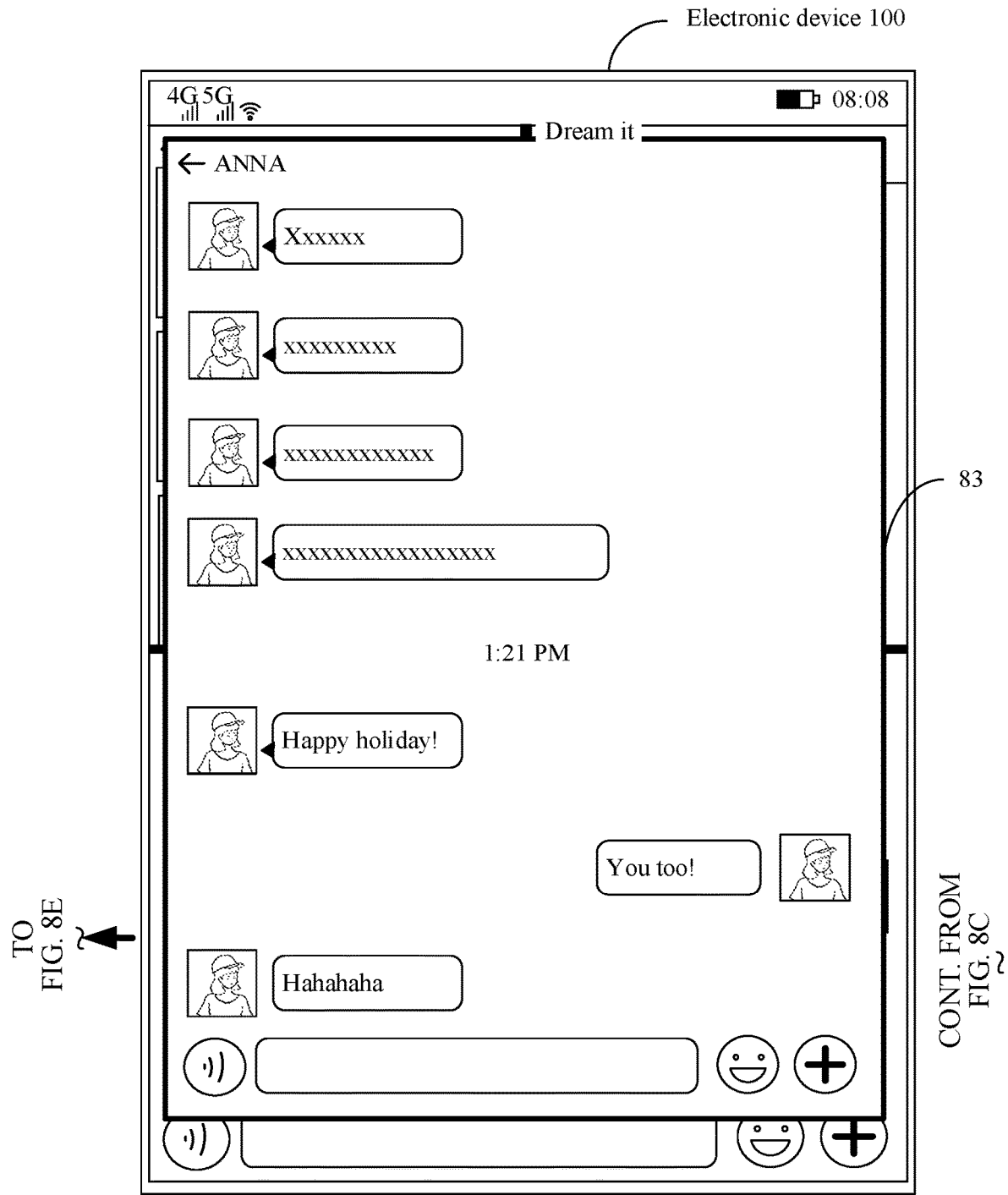

Further, after obtaining the target split screen, the electronic device sequentially displays, in full screen, the interface of the application corresponding to each split screen included in the target split screen. As shown in FIG. 8B, the electronic device displays, in full screen above the layer in which the screen split state shown in FIG. 8A is displayed, the gallery application corresponding to the first split screen 610, to save and obtain a full-displayed user interface 81 of the gallery. Then, as shown in FIG. 8C, the electronic device displays, in full screen above the layer in which the screen split state shown in FIG. 8A is displayed, NetEase CloudMusic corresponding to the second split screen 611, to save and obtain a full-displayed user interface 82 of NetEase CloudMusic. As shown in FIG. 8D, the electronic device displays, in full screen above the layer in which the screen split state shown in FIG. 8A is displayed, the WeChat application corresponding to the third split screen 612, to save and obtain a full-displayed user interface 83 of WeChat.

Figure 8E:
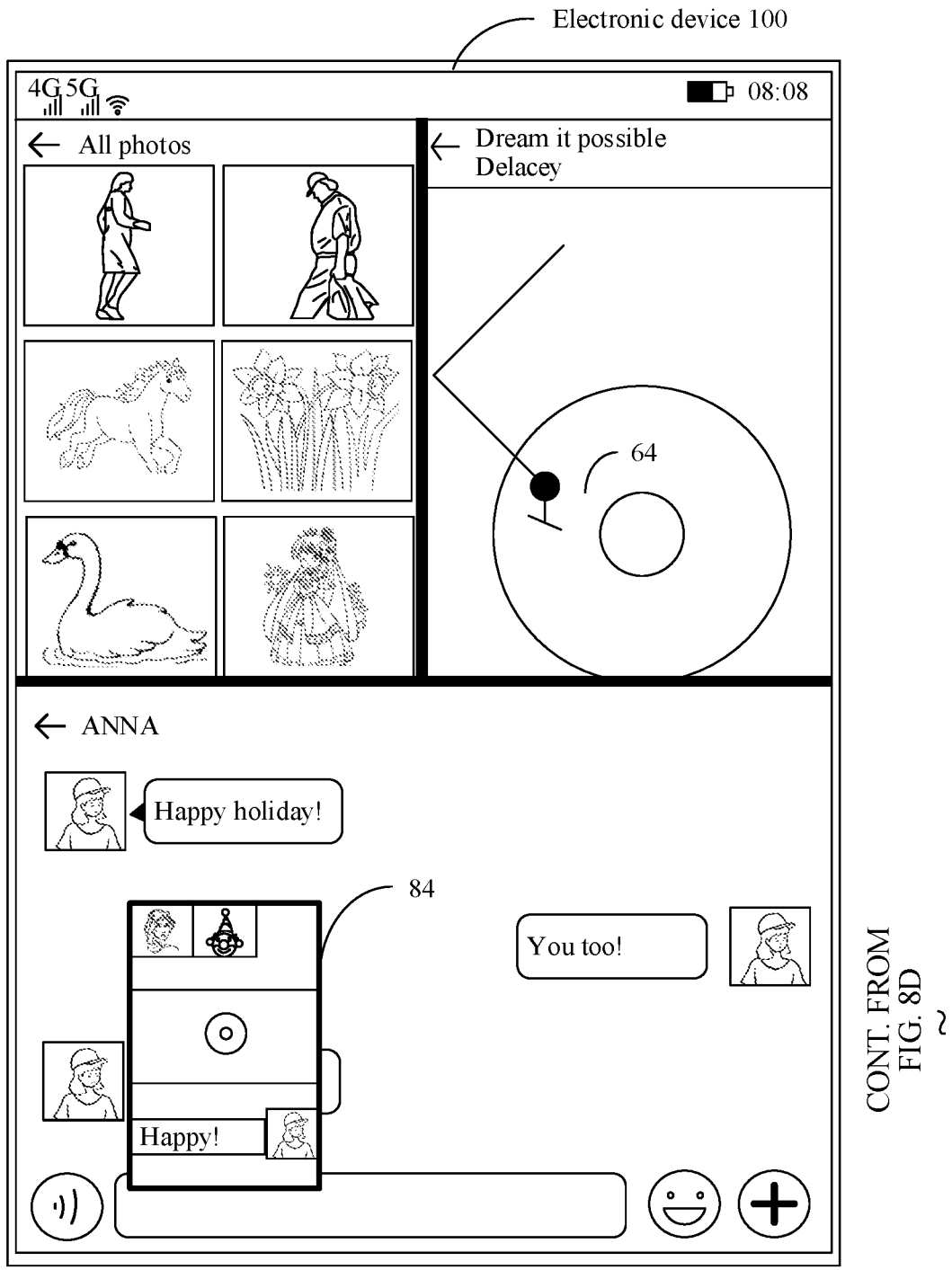

Further, the electronic device 100 splices the user interface 81, the user interface 82, and the user interface 83 to obtain the screenshot picture, and generates a thumbnail 84 of the screenshot picture. As shown in FIG. 8E, the thumbnail 84 of the screenshot picture is displayed above the third split screen 612 in a floating manner.

Figure 8F:
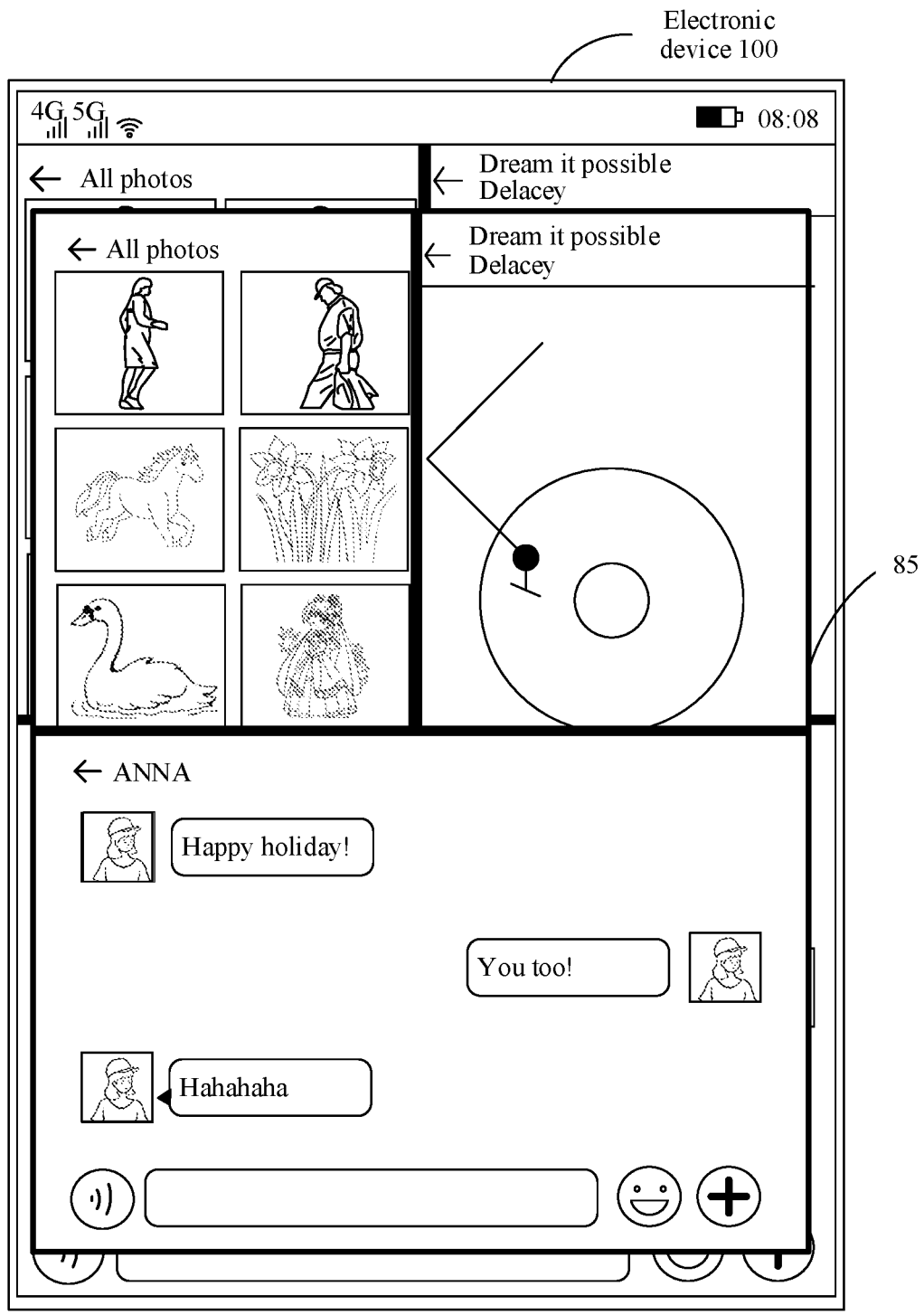
FIG. 8F is yet another schematic diagram of obtaining a screenshot picture according to an embodiment of this application.

In a possible implementation, after obtaining the target split screen, the electronic device 100 may further directly respond to the screen capturing operation in the screen split state, to obtain the screenshot picture. In this case, the screenshot picture includes an interface of an application displayed in the screen split state by each split screen in the target split screen. Specifically, with reference to the description shown in FIG. 8A, the electronic device 100 determines that the first location (x4, y4) at which the screen capturing operation is input is within the first range 640. Therefore, the electronic device 100 determines that the target split screen includes the second split screen 611 and the third split screen 612. FIG. 8F is yet another schematic diagram of obtaining a screenshot picture according to an embodiment of this application. As shown in FIG. 8F, the electronic device 100 may further directly perform the screen capturing operation in the screen split state, to obtain a screenshot picture 85. The screenshot picture 85 includes the user interface 60 of the gallery displayed by the first split screen 610, the user interface 61 of NetEase CloudMusic displayed by the second split screen 611, and the user interface 62 of WeChat displayed by the third split screen 612 in the screen split state.

Figure 9:
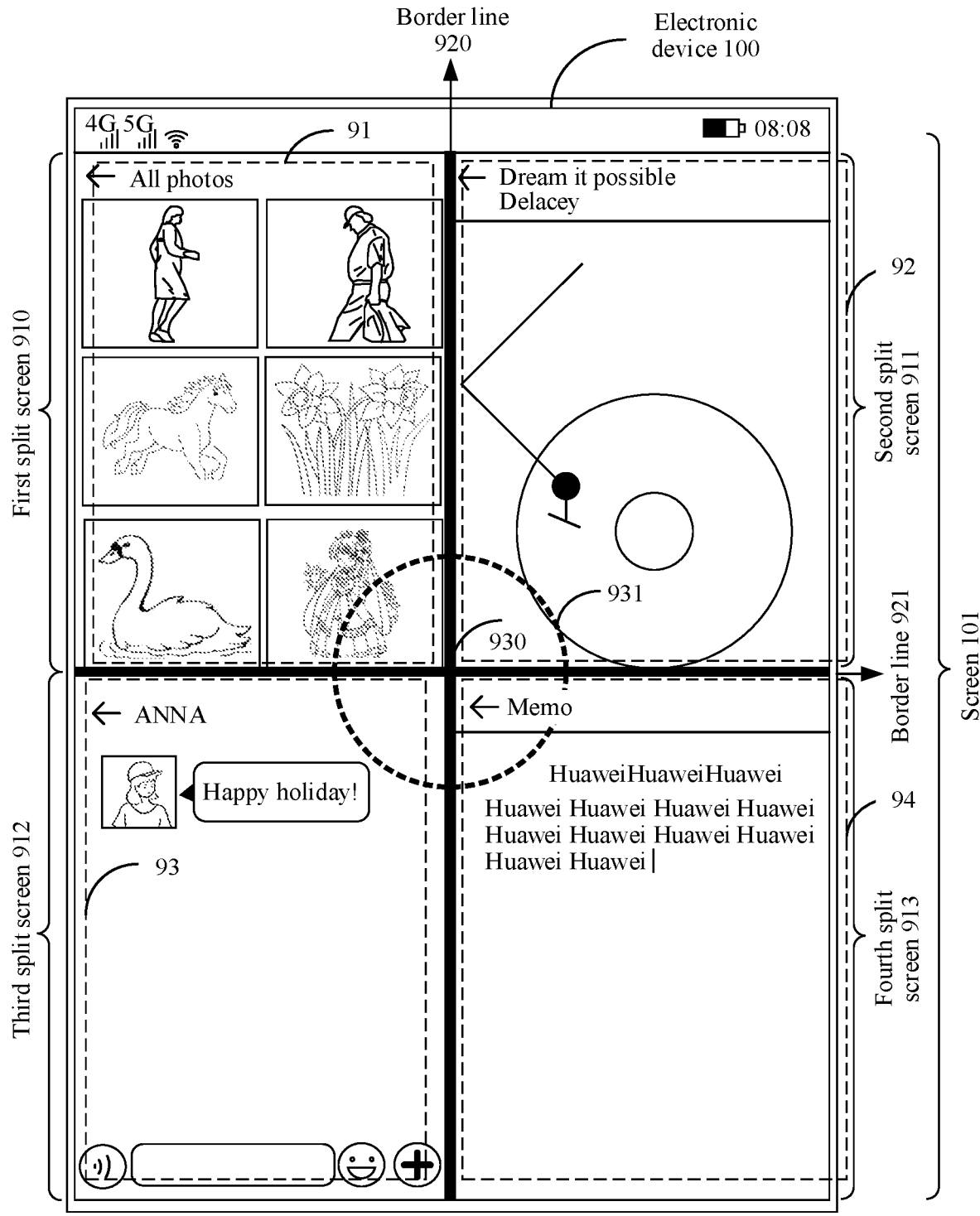
FIG. 9 is a schematic diagram of a user interface according to an embodiment of this application.

In a possible implementation, the electronic device 100 may further include four split screens. FIG. 9 is a schematic diagram of a user interface according to an embodiment of this application. As shown in FIG. 9, the electronic device 100 displays four split screens by using the screen 101, which are respectively a first split screen 910, a second split screen 911, a third split screen 912, and a fourth split screen 913. The first split screen 910 displays a user interface 91 of the gallery, the second split screen 911 displays a user interface 92 of NetEase Cloud, the third split screen 912 displays a user interface 93 of WeChat, and the fourth split screen displays a user interface 94 of a memo. Each split screen is distinguished from other split screens by using a border line 920 and a border line 921. The border line 920 intersects with the border line 921, to form an intersection point 930. With reference to the foregoing description in FIG. 6A to FIG. 6C, and FIG. 8A to FIG. 8F, the electronic device 100 may receive the input screen capturing operation, and further, in response to the screen capturing operation, obtain the screenshot picture corresponding to the screen capturing operation. As shown in FIG. 9, for example, when the electronic device 100 determines, based on the first location at which the screen capturing operation is input, that the target intersection point is 930, and the electronic device 100 detects that the first location is located within a first range 931, the electronic device 100 determines that the target split screen is the first split screen 910, the second split screen 911, the third split screen 912, and the fourth split screen 913 that are adjacent to the intersection point 930.

For a specific implementation in which the electronic device 100 obtains the target split screen, refer to the specific description in FIG. 6A to FIG. 6C, and FIG. 8A to FIG. 8F. Details are not described herein again.

Figure 10A:
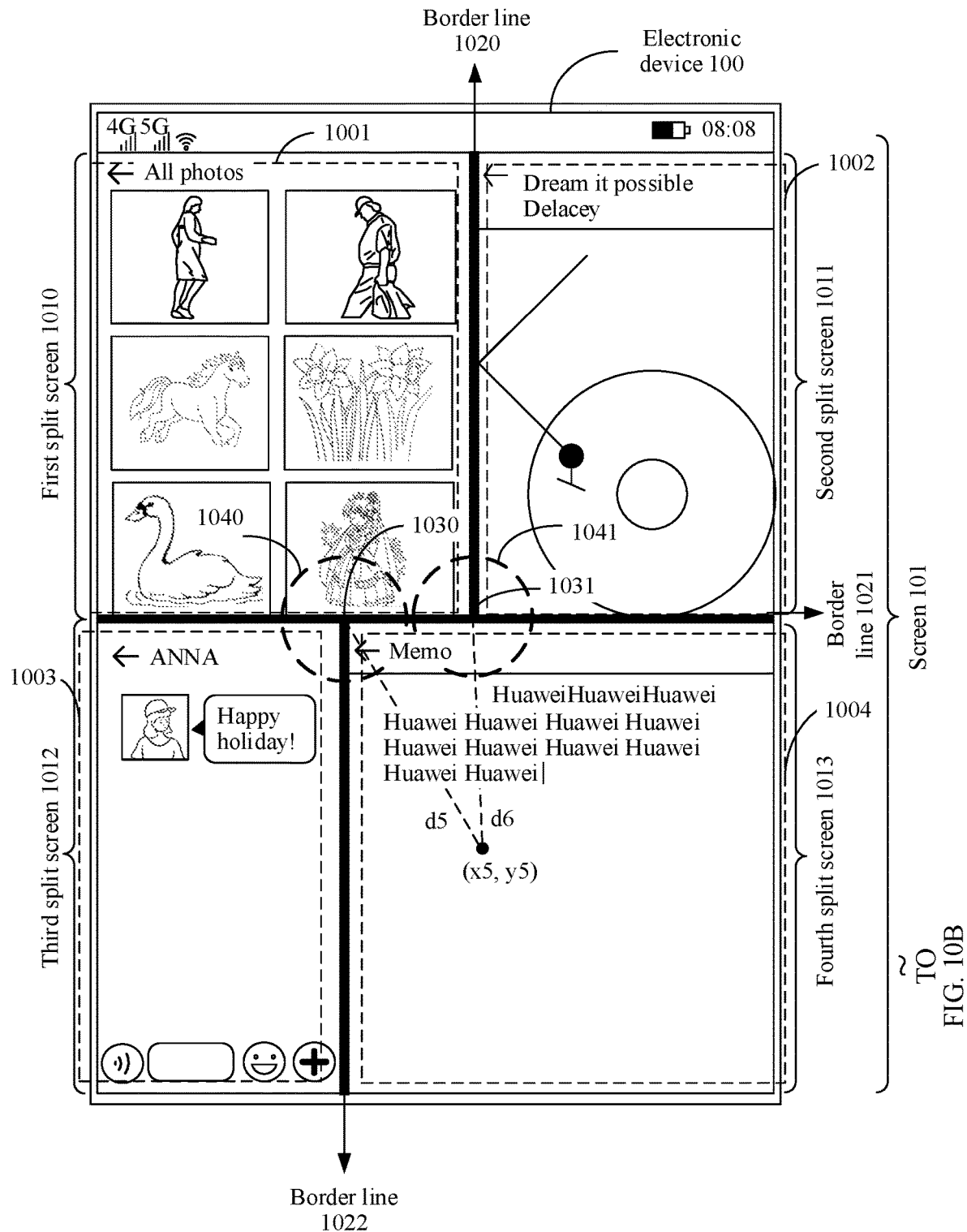
FIG. 10A to FIG. 10C are a schematic diagram of obtaining a target split screen according to an embodiment of this application.
Figure 10B:
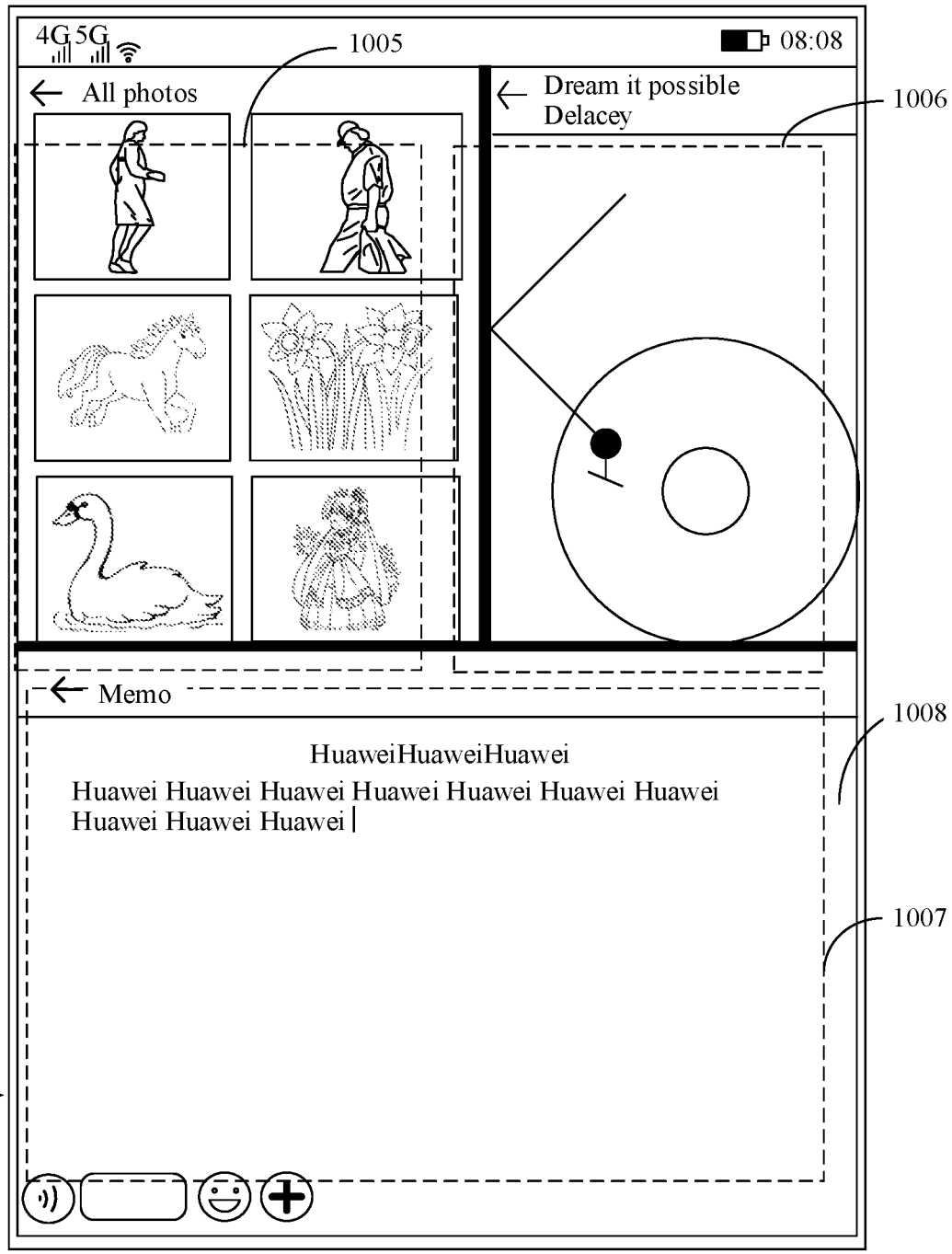
Figure 10C:
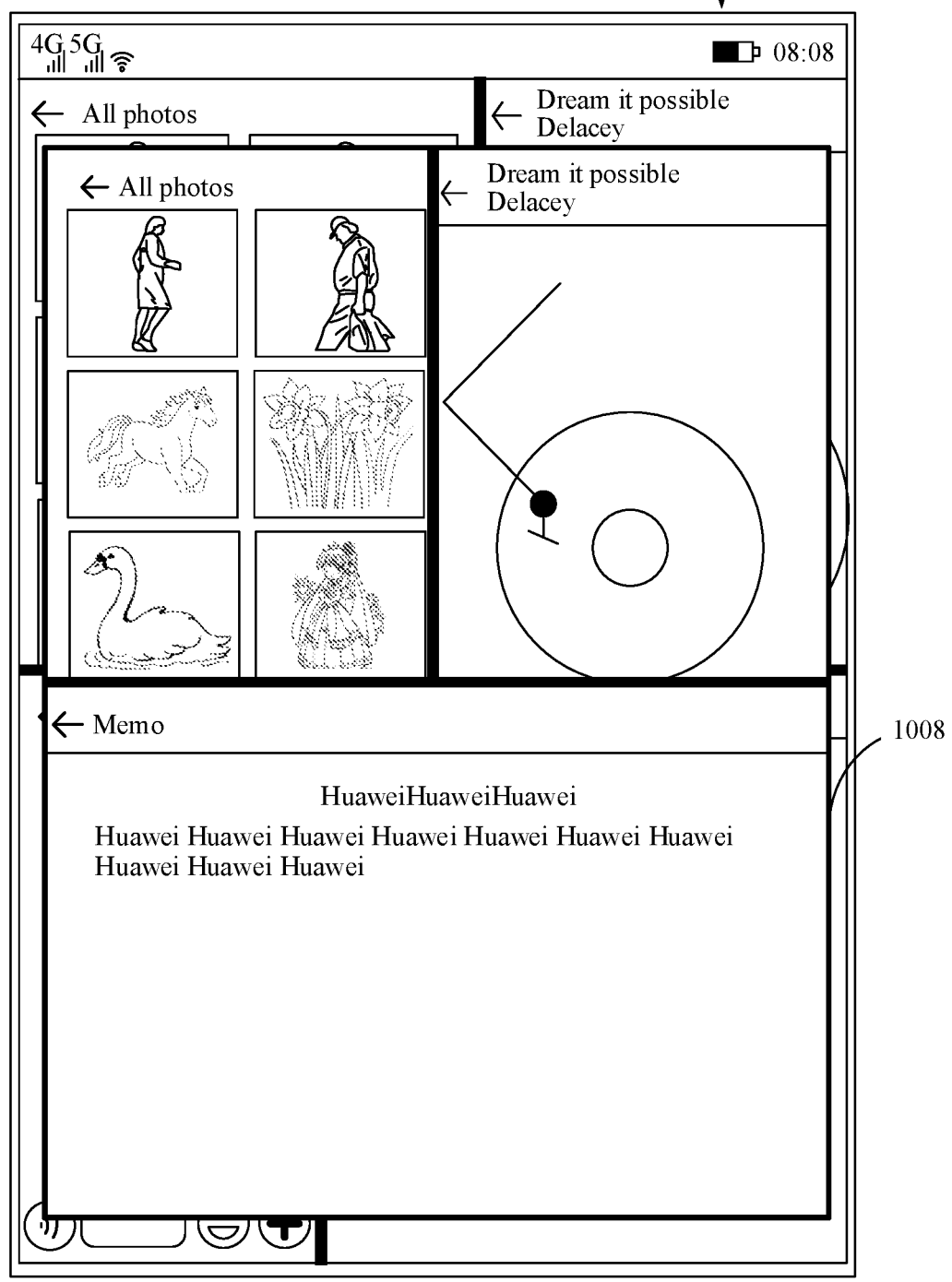

FIG. 10A to FIG. 10C are a schematic diagram of obtaining a target split screen according to an embodiment of this application. As shown in FIG. 10A, the electronic device displays four split screens by using the screen 101, which are respectively a first split screen 1010, a second split screen 1011, a third split screen 1012, and a fourth split screen 1013. The first split screen 1010 displays a user interface 1001 of the gallery, the second split screen 1011 displays a user interface 1002 of NetEase Cloud, the third split screen 1012 displays a user interface 1003 of WeChat, and the fourth split screen 1013 displays a user interface 1004 of the memo. Each split screen is distinguished from other split screens by using a border line 1020 and a border line 1021. The border line 1020 intersects with the border line 1021, to form an intersection point 1031. The border line 1021 intersects with a border line 1022, to form an intersection point 1030. With reference to the foregoing description in FIG. 6A to FIG. 6C, and FIG. 8A to 8F, the electronic device 100 may receive the input screen capturing operation, and further, in response to the screen capturing operation, obtain the screenshot picture corresponding to the screen capturing operation. Specifically, as shown in FIG. 10A, when the electronic device 100 detects that the input user operation (for example, one knock on a user interface included in the screen 101 by using a finger joint of an index finger or a middle finger) is the screen capturing operation: first, the electronic device 100 obtains the first location at which the screen capturing operation is input, for example, (x5, y5) shown in FIG. 10A. Further, the electronic device 100 may calculate a distance between the first location at which the screen capturing operation is input and each of the at least one intersection point, to obtain a second distance set. As shown in FIG. 10A, the distance between (x5, y5) and the intersection point 1030 is d5, and the distance between (x5, y5) and the intersection point 1031 is d6. If d5 is greater than d6, the electronic device 100 determines that the intersection point 1031 is the target intersection point. Further, the electronic device 100 forms the first range (1041 shown in FIG. 10A in this case) by using the intersection point 1031 as the center and using R as the radius. Further, the electronic device 100 determines whether the first location is within the first range. When the electronic device 100 determines that the first location is not within the first range, the electronic device 100 determines that the split screen to which the first location belongs is the target split screen. For example, as shown in FIG. 10A, (x5, y5) is not within the range 1041, and the electronic device 100 determines that the fourth split screen 1013 to which (x5, y5) belongs is the target split screen.

In a possible implementation, if the first location at which the screen capturing operation is input is within the range 1041, in this case, the electronic device 100 determines that the first split screen 1010, the second split screen 1011, and the fourth split screen 1013 that are adjacent to the intersection point 1041 are the target split screen.

It should be understood that, after obtaining the target split screen, the electronic device displays, in full screen, the application corresponding to each split screen included in the target split screen. For the description of obtaining the full-displayed interface of each application in the target split screen, refer to the related description in FIG. 6A to FIG. 6C, and FIG. 8A to FIG. 8F. Details are not described herein again.

In a possible implementation, after the electronic device 100 obtains the target split screen, if a quantity of target split screens is less than a quantity of split screens in the screen split state, the electronic device 100 may further form a first screen split state based on the target split screen, and further, obtain an interface displayed by each split screen in the target split screen in the first screen split state, to obtain the screenshot picture. Specifically, with reference to the foregoing description shown in FIG. 10A, if the first location at which the screen capturing operation is input is within the range 1041, the electronic device 100 determines that the first split screen 1010, the second split screen 1011, and the fourth split screen 1013 are the target split screen. Further, the electronic device 100 may create a layer above the layer in which a current screen split state (the screen split state shown in FIG. 10A) is displayed, to display the split screens included in the target split screen, that is, the first screen split state. The first screen split state is used to display a user interface of an application corresponding to each split screen in the target split screen. As shown in FIG. 10B, the first screen split state displays the user interface 1005 of the gallery displayed by the first split screen 1010, the user interface 1006 of NetEase CloudMusic displayed by the second split screen 1011, and the user interface 1007 of the memo displayed by the fourth split screen. Further, the electronic device 100 captures the user interface in the first screen split state, to obtain a screenshot picture 1008. As shown in FIG. 10C, the screenshot picture 1008 includes the interface of the application displayed by each split screen in the target split screen in the first screen split state.

It should be understood that the user interfaces shown in FIG. 1A to FIG. 10C are merely examples for describing this embodiment of this application, and the electronic device 100 may further include more or fewer split screens. A display region of each split screen and content displayed by each split screen should not constitute a limitation on this application.

Figure 11:
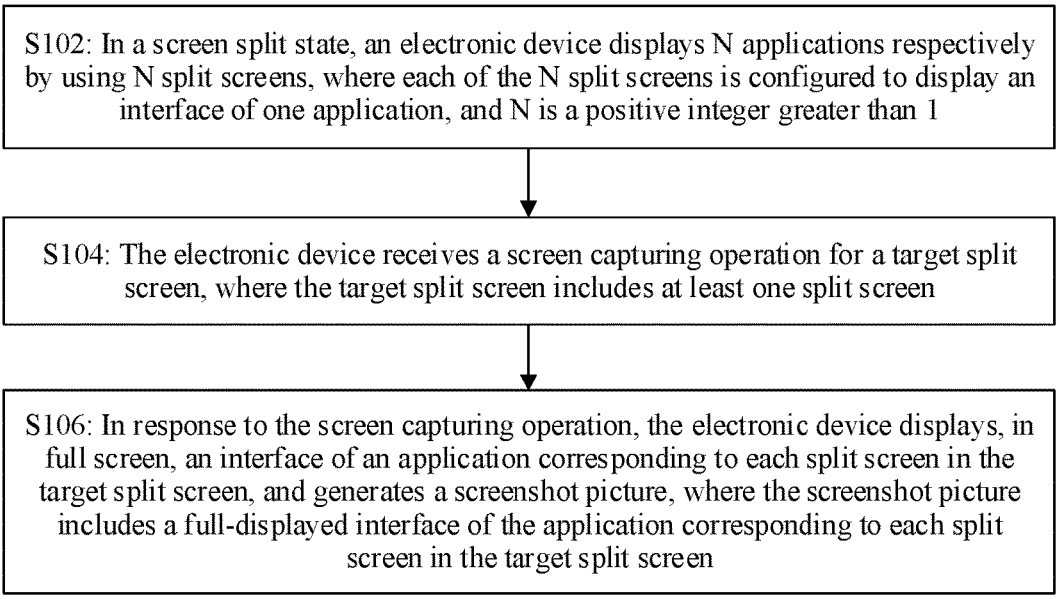
FIG. 11 is a schematic flowchart of a screen capturing method according to an embodiment of this application.

The following specifically describes a screen capturing method according to an embodiment of this application with reference to FIG. 1A to FIG. 10C. The method may be performed by the electronic device 100 mentioned in FIG. 1A to FIG. 10C. FIG. 11 is a schematic flowchart of a screen capturing method according to an embodiment of this application. As shown in FIG. 11, the screen capturing method may include some or all of the following steps.

S102: In a screen split state, the electronic device displays N applications respectively by using N split screens, where each of the N split screens is configured to display an interface of one application, and N is a positive integer greater than 1.

In this embodiment of this application, the electronic device may be a device with a display such as a mobile phone, a tablet computer, a computer, or a television. This is not limited herein. In the screen split state, for an implementation in which the electronic device displays the N applications respectively by using the N split screens, refer to the foregoing description about the user interface in FIG. 1A to FIG. 10C for details.

S104: The electronic device receives a screen capturing operation for a target split screen, where the target split screen includes at least one split screen.

In this embodiment of this application, the screen capturing operation may be a touch operation in forms such as double tap, triple tap, and knock (single knock or two successive knocks) or another gesture operation performed by a user on the screen, or an input operation performed by an input device on the screen, for example, an input operation of a cursor controlled by a mouse on a screen of a computer, or a tap operation of a stylus on a screen of a tablet computer or a mobile phone. This is not limited in this application. The target split screen is at least one split screen in the N split screens.

The N split screens form M border lines, and M is a positive integer. That the electronic device receives a screen capturing operation for a target split screen specifically includes: The electronic device receives the screen capturing operation input at a first location; and further, the electronic device determines the target split screen based on the first location and the M border lines.

It should be understood that, an expression form in which the N split screens form the M border lines may include two categories. In a first category, the M border lines are parallel to each other, and do not form an intersection point, as shown in FIG. 1B. In a second category, the M border lines form at least one intersection point, as shown in FIG. 1C. Therefore, that the electronic device determines the target split screen based on the first location and the M border lines may include two categories of implementations.

Figure 12:
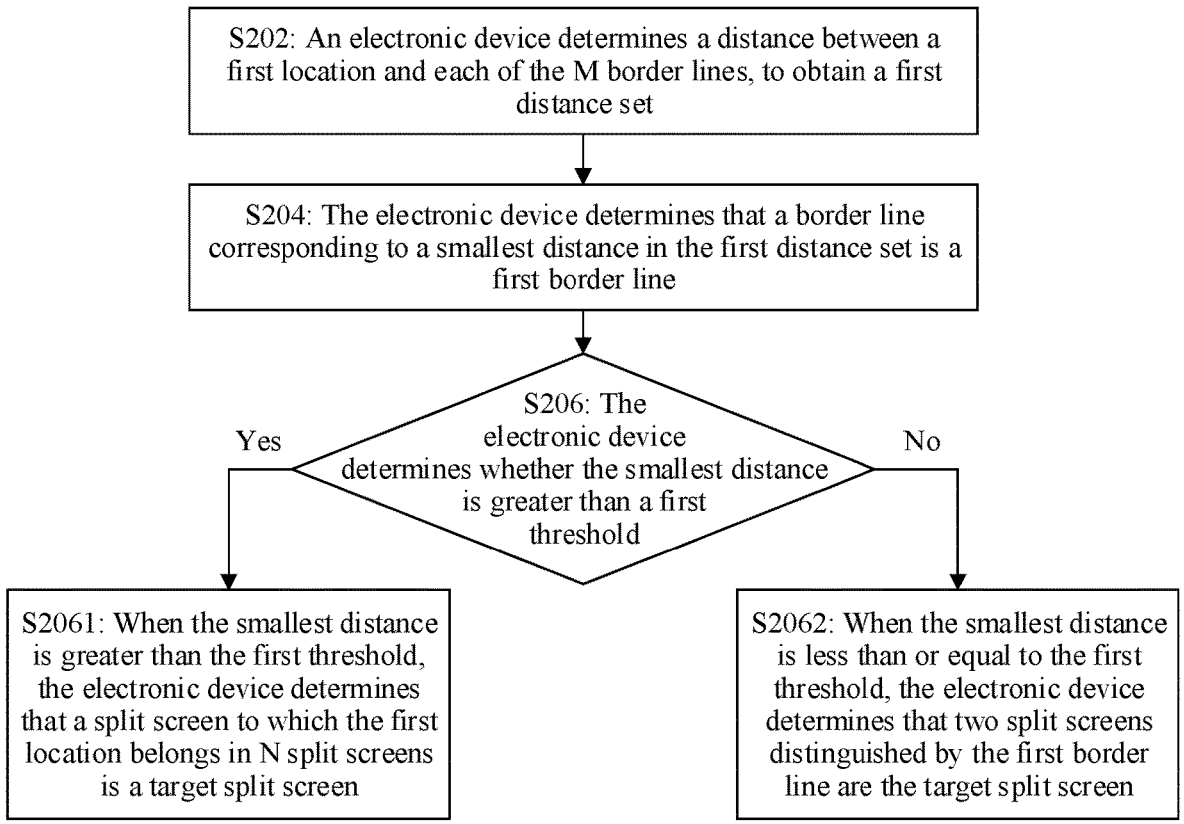
FIG. 12 is a flowchart of a method for determining a target split screen by an electronic device according to an embodiment of this application.

In the first category: the M border lines are parallel to each other, and do not form an intersection point. FIG. 12 is a flowchart of a method for determining a target split screen by an electronic device according to an embodiment of this application. As shown in FIG. 12, an implementation in which the electronic device determines the target split screen based on a first location and M border lines may include some or all of the following steps.

S202: The electronic device determines a distance between the first location and each of the M border lines, to obtain a first distance set.

In this embodiment of this application, the first location is a location at which the screen capturing operation is input on a screen of the electronic device. The distance between the first distance and each of the M border lines may be a vertical distance between the first location and each border line.

S204: The electronic device determines that a border line corresponding to a smallest distance in the first distance set is a first border line.

S206: The electronic device determines whether the smallest distance is greater than a first threshold.

S2061: When the smallest distance is greater than the first threshold, the electronic device determines that a split screen to which the first location belongs in the N split screens is the target split screen.

S2062: When the smallest distance is less than or equal to the first threshold, the electronic device determines that two split screens distinguished by the first border line are the target split screen.

Specifically, for a method for determining the target split screen in steps S202 to S2062, refer to the foregoing related description of determining the target split screen by the electronic device in FIG. 2A to FIG. 2C, FIG. 4A to FIG. 4F, and FIG. 5 for details. Details are not described herein again.

It should be understood that, the first threshold may be set based on an actual situation. This is not limited in this application.

Figure 13:
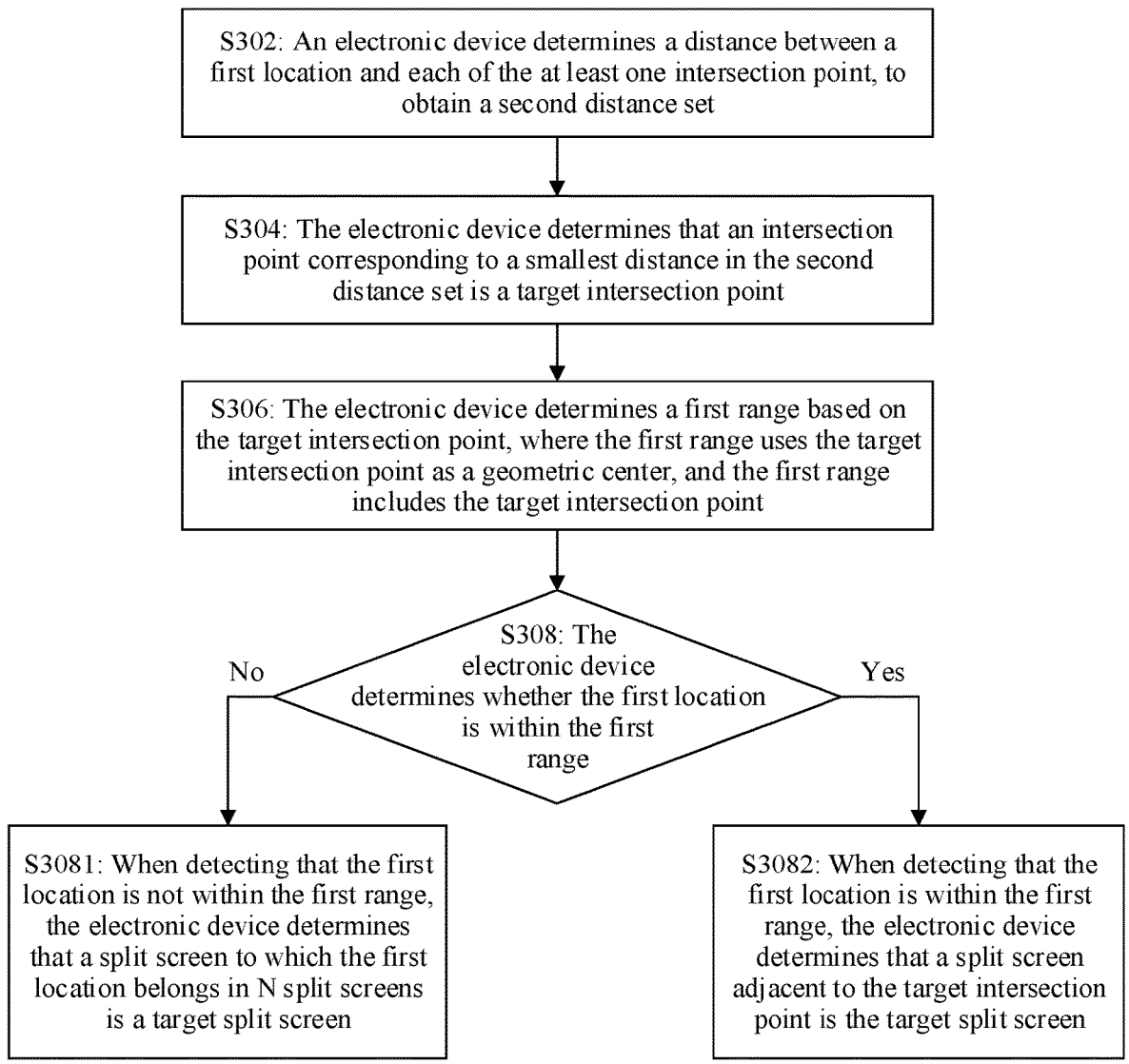
FIG. 13 is a schematic diagram of a method for obtaining a target split screen by an electronic device according to an embodiment of this application.

In the second category: the M border lines form at least one intersection point. FIG. 13 is a schematic diagram of a method for obtaining a target split screen by an electronic device according to an embodiment of this application. As shown in FIG. 13, an implementation in which the electronic device determines the target split screen based on a first location and M border lines may specifically include some or all of the following steps.

S302: The electronic device determines a distance between the first location and each of the at least one intersection point, to obtain a second distance set.

S304: The electronic device determines that an intersection point corresponding to a smallest distance in the second distance set is a target intersection point.

S306: The electronic device determines a first range based on the target intersection point, where the first range uses the target intersection point as a geometric center, and the first range includes the target intersection point.

S308: The electronic device determines whether the first location is within the first range.

S3081: When detecting that the first location is not within the first range, the electronic device determines that a split screen to which the first location belongs in the N split screens is the target split screen.

S3082: When detecting that the first location is within the first range, the electronic device determines that a split screen adjacent to the target intersection point is the target split screen.

Specifically, for a method for determining the target split screen in steps S302 to S3082, refer to the foregoing related description of obtaining the target split screen by the electronic device in FIG. 6A to FIG. 6C, FIG. 8A to FIG. 8F, FIG. 9, and FIG. 10A to FIG. 10C for details. Details are not described herein again.

It should be understood that, a form of the first range should not be limited to the foregoing specific description in FIG. 6A to FIG. 6C, FIG. 8A to FIG. 8F, FIG. 9, and FIG. 10A to FIG. 10C. The first range may be alternatively another shape including the target intersection point. This is not limited in this application. For example, in an implementation, the first range may be a square formed by using the target intersection point as a geometric center and using A as a side length.

S106: In response to the screen capturing operation, the electronic device displays, in full screen, an interface of an application corresponding to each split screen in the target split screen, and generates a screenshot picture, where the screenshot picture includes a full-displayed interface of the application corresponding to each split screen in the target split screen.

Specifically, refer to the foregoing related description of obtaining the screenshot picture by the electronic device based on the target split screen in FIG. 2A to FIG. 2C, FIG. 4A to FIG. 4F, FIG. 6A to FIG. 6C, FIG. 8A to FIG. 8F. Details are not described herein again.

It should be understood that, if the N split screens included in the electronic device in the screen split state respectively display the N applications in a first layer, that the electronic device displays, in full screen, the target split screen in step S106 may include the following two implementations.

In an implementation (1): in a possible implementation, the electronic device sequentially displays, in full screen above the first layer, the interface of the application corresponding to each split screen in the target split screen; and further, the electronic device splices the full-displayed interface of the application corresponding to each split screen in the target split screen, to generate the screenshot picture.

Specifically, for an implementation in which the electronic device displays, in full screen above the first layer, the application corresponding to each split screen in the target split screen, refer to the foregoing description of displaying, by the electronic device in full screen, the application corresponding to the target split screen, to obtain the full-displayed user interface of the application corresponding to each split screen in the target split screen in FIG. 2B, FIG. 4B and FIG. 4C, FIG. 6B, and FIG. 8B to FIG. 8D. Details are not described herein again.

For a specific implementation in which the electronic device splices the full-displayed interface of the application corresponding to each split screen in the target split screen to generate the screenshot picture, refer to the foregoing related description in FIG. 4B. This is not limited herein.

In an implementation (2): in another possible implementation, the electronic device sequentially displays, in full screen in the first layer, the interface of the application corresponding to each split screen in the target split screen; and further, the electronic device splices the full-displayed interface of the application corresponding to each split screen in the target split screen, to generate the screenshot picture.

Specifically, before the electronic device displays, in full screen in the first layer, the application corresponding to the target split screen, location information of each split screen in the screen split state displayed in the first layer and a state of the application corresponding to each split screen may be first recorded. Further, the application corresponding to each split screen in the target split screen is displayed in full screen in the first layer at one time, to obtain the full-displayed interface of the application corresponding to each split screen in the target split screen. Then, the electronic device may splice the full-displayed interface of the application corresponding to each split screen in the target split screen, to obtain the screenshot picture. Finally, the electronic device may recover the foregoing screen split state based on the recorded location information of each split screen in the screen split state and the recorded state of the application corresponding to each split screen. The electronic device sequentially displays, in full screen in the first layer, the interface of the application corresponding to each split screen in the target split screen. This may be implemented by using a stack.

It should be understood that, this application is not limited to the implementations in which the electronic device displays, in full screen, the application corresponding to the target split screen and that are provided in the foregoing implementation (1) and implementation (2). The foregoing is merely examples for describing this embodiment of this application. A full-displayed picture of the application corresponding to the target split screen may be alternatively obtained in another manner, to obtain the screenshot picture. This is not limited in this embodiment of this application.

Optionally, after the electronic device generates the screenshot picture, and recovers, in the first layer, the screen split state in which the N split screens respectively display the N applications, the screen capturing method may further include: the electronic device displays a thumbnail of the screenshot picture above the first layer.

Specifically, for an implementation in which the electronic device displays the thumbnail of the screenshot picture above the first layer, refer to the foregoing related description in FIG. 2C, FIG. 4D, FIG. 6C, and FIG. 8E. Details are not described herein again.

Optionally, after the thumbnail of the screenshot picture is generated, the screen capturing method may further include: the electronic device receives a drag operation for the thumbnail of the screenshot picture; and further, in response to the drag operation, when detecting that the drag operation disappears, the electronic device determines a to-be-executed split screen, and the electronic device performs a target operation on the screenshot picture by using an application corresponding to the to-be-executed split screen.

The following describes the foregoing implementations of determining the to-be-executed split screen.

In an implementation (1): the electronic device obtains a quantity of pixels of the thumbnail of the screenshot picture in each of the N split screens; and further, the electronic device determines that a split screen corresponding to a largest quantity of pixels is the to-be-executed split screen.

Specifically, when detecting that the drag operation acting on the thumbnail disappears, the electronic device calculates the quantity of pixels of the thumbnail that fall onto each of the N split screens, and determines that the split screen corresponding to the largest quantity of pixels is the to-be-executed split screen.

In an implementation (2): the electronic device determines that a split screen in which an endpoint location of the drag operation is located is the to-be-executed split screen.

Specifically, when detecting that the drag operation acting on the thumbnail disappears, the electronic device obtains a location at which the drag operation disappears, and further, determines that a split screen to which the location belongs is the to-be-executed split screen.

In an implementation, an application corresponding to the to-be-executed split screen is a chat window, and that the electronic device performs a target operation on the screenshot picture by using an application corresponding to the to-be-executed split screen may include: The electronic device automatically sends the screenshot picture in the chat window.

Specifically, refer to the foregoing related description in FIG. 6A to FIG. 6C. As shown in FIG. 6C, after the drag operation disappears, when the electronic device determines that the chat window is the to-be-executed split screen, the electronic device may automatically send, in the chat window, the screenshot picture corresponding to the thumbnail.

In an implementation, an application corresponding to the to-be-executed split screen is a gallery, and the electronic device saves the screenshot picture in a specified storage folder of the gallery.

Specifically, refer to the foregoing related description in FIG. 3A to FIG. 3C. As shown in FIG. 3C, after the drag operation disappears, the electronic device determines that the gallery is the to-be-executed split screen. The electronic device may store the picture corresponding to the thumbnail in a currently displayed folder, and display the thumbnail in the folder.

It should be understood that, without being limited by the above provided application corresponding to the to-be-executed split screen, the foregoing operation performed by the electronic device on the screenshot picture by using the to-be-executed split screen is merely an example for describing this application, and should not limit this embodiment of this application. Another implementation may be further included. For example, in an implementation, when the electronic device detects that the drag operation disappears, and the application corresponding to the to-be-executed split screen is document editing, the electronic device may place the screenshot picture corresponding to the thumbnail at a focus location of document editing.

In this embodiment of this application, in the screen split state, the electronic device displays the N applications respectively by using the N split screens, where one split screen is configured to display the interface of one application, and N is a positive integer greater than 1; further, the electronic device receives the screen capturing operation for the target split screen, where the target split screen includes at least one split screen; finally, in response to the screen capturing operation, the electronic device displays, in full screen, the interface of the application corresponding to each split screen in the target split screen, and generates the screenshot picture, where the screenshot picture includes the full-displayed interface of the application corresponding to each split screen in the target split screen. By implementing this embodiment of this application, the interface of the application separately corresponding to the to-be-captured split screen (that is, the target split screen) is displayed in full screen, so that the screenshot picture obtained by the electronic device includes the full-displayed interface image of the application corresponding to each split screen in the to-be-captured split screen. Compared with the screenshot picture directly captured in the screen split state, content displayed is richer, and can better satisfy a requirement of the user for obtaining information from the screenshot picture. Therefore, quality of the screenshot picture generated in the screen split state can be improved.

The following describes the example electronic device 100 according to an embodiment of this application.

Figure 14:
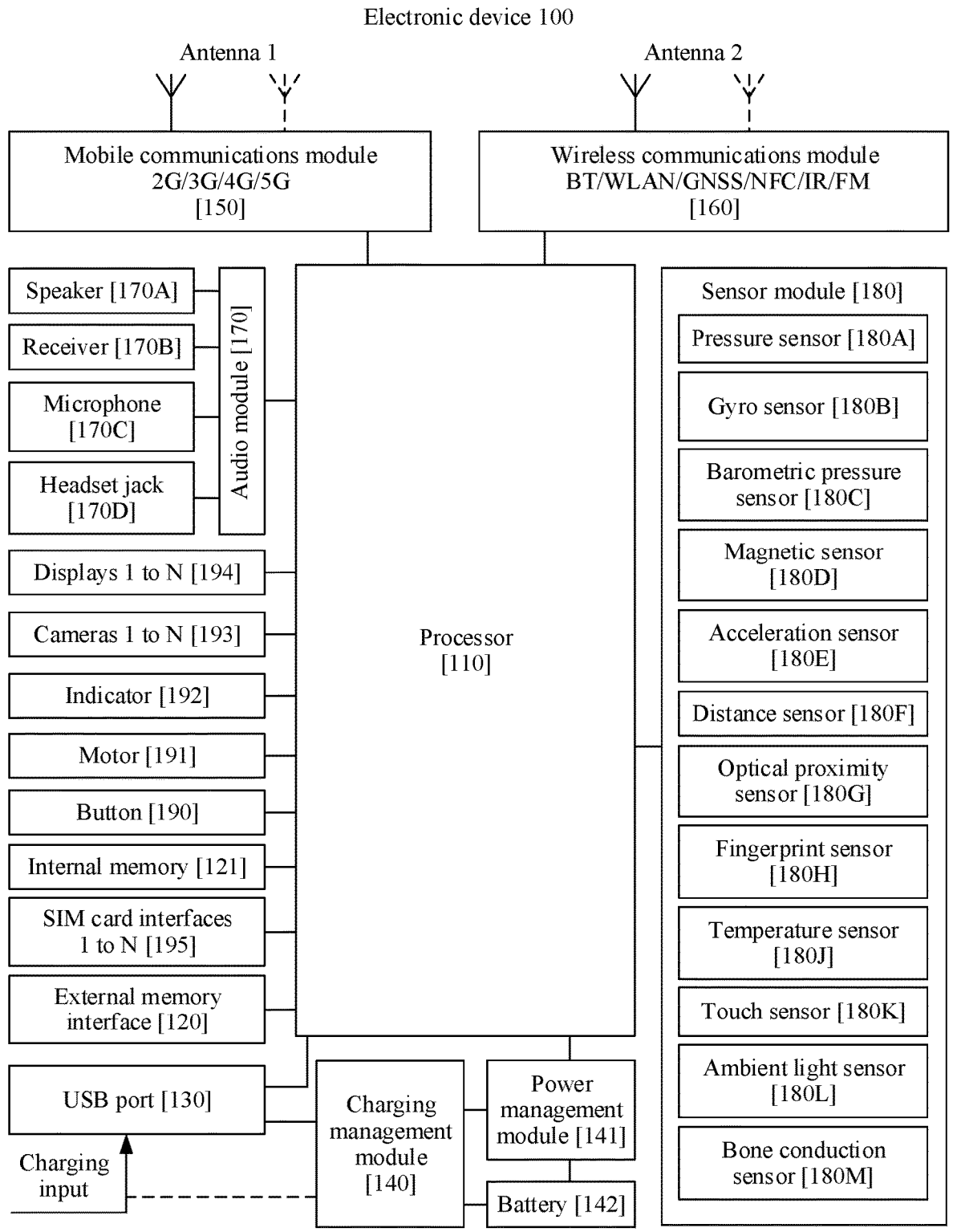
FIG. 14 is a schematic diagram of a structure of an electronic device according to an embodiment of this application.

FIG. 14 is a schematic diagram of a structure of an electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be alternatively disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be alternatively configured as the I2C interface, the I2S interface, the UART interface, the MIPI interface, or the like.

The USB port 130 is an interface that conforms to a USB standard specification, and may be specifically a mini USB interface, a micro USB interface, a USB Type C interface, or the like. The USB port 130 may be configured to connect to a charger to charge the electronic device 100, or may be configured to transmit data between the electronic device 100 and a peripheral device, or may be configured to connect to a headset, to play audio by using the headset. The port may be alternatively configured to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may alternatively be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution applied to the electronic device 100 for wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may alternatively amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may alternatively receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

In this embodiment of this application, the display panel may be a touchscreen, so that a user can perform a gesture operation on the touchscreen, or perform an operation on the display by using a device that controls the electronic device 100. This is not limited herein.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130 or a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may alternatively calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen that is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

In a possible implementation, the electronic device 100 may detect, by using the bone sensor, whether an operation input by the user is a screen capturing operation.

The button 190 includes a power button, a volume button, and the like. The button 190 may be a mechanical button, or a touch button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

According to the context, the term "when" used in the foregoing embodiments may be interpreted as a meaning of "if" or "after" or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

What is claimed is:

1. A screen capturing method, comprising:
   in a screen split state, displaying, by an electronic device, N applications respectively by using N split screens, wherein each split screen of the N split screens is configured to display an interface of one application, and N is a positive integer greater than 1, wherein the N split screens respectively display the N applications in a first layer;
   receiving, by the electronic device, a screen capturing operation for at least one target split screen of the N split screens;
   in response to the screen capturing operation, displaying, by the electronic device, in full screen, an interface of an application corresponding to each of the at least one target split screen, generating a screenshot picture and displaying a thumbnail of the screenshot picture above the first layer,
      wherein the screenshot picture comprises a full-displayed interface of the application corresponding to each of the at least one target split screen,
      wherein the full-displayed interface of the application corresponding to a particular target split screen of the at least one target split screen of the N split screens includes additional content of the interface of the application not displayed in the interface of the application displayed in the particular target split screen;
   receiving, by the electronic device, a drag operation for the thumbnail of the screenshot picture;
   in response to the drag operation and in response to detecting that the drag operation disappears, determining, by the electronic device, a to-be-executed split screen, including:
      obtaining, by the electronic device, a quantity of pixels of the thumbnail of the screenshot picture that fall onto each of the N split screens; and
      determining, by the electronic device, that a split screen corresponding to a largest quantity of pixels that fall onto each of the N split screens is the to-be-executed split screen.

2. The method according to claim 1, wherein the N split screens form M border lines, and M is a positive integer; and
   the receiving, by the electronic device, the screen capturing operation for the at least one target split screen comprises:
   receiving, by the electronic device, the screen capturing operation at a first location; and
   determining, by the electronic device, the at least one target split screen based on the first location and the M border lines.

3. The method according to claim 2, wherein the M border lines are parallel to each other; and
   the determining, by the electronic device, the at least one target split screen based on the first location and the M border lines comprises:
   determining, by the electronic device, a distance between the first location and each of the M border lines, to obtain a first distance set;
   determining, by the electronic device, that a border line corresponding to a smallest distance in the first distance set is a first border line; and
   responsive to determining that the smallest distance is greater than a first threshold, determining, by the electronic device, that a particular split screen to which the first location belongs in the N split screens is the target split screen.

4. The method according to claim 3, wherein the method further comprises:
   responsive to determining that the smallest distance is less than or equal to the first threshold, determining, by the electronic device, that two split screens distinguished by the first border line are included in the at least one target split screen.

5. The method according to claim 2, wherein the M border lines form at least one intersection point; and the determining, by the electronic device, the at least one target split screen based on the first location and the M border lines comprises:
determining, by the electronic device, a distance between the first location and each of the at least one intersection point, to obtain a second distance set;
determining, by the electronic device, that an intersection point corresponding to a smallest distance in the second distance set is a target intersection point;
determining, by the electronic device, a first range based on the target intersection point, wherein the first range uses the target intersection point as a geometric center, and the first range comprises the target intersection point; and
responsive to detecting that the first location is not within the first range, determining, by the electronic device, that a split screen to which the first location belongs in the N split screens is the at least one target split screen.

6. The method according to claim 5, wherein the method further comprises:
responsive to detecting that the first location is within the first range, determining, by the electronic device, that a split screen adjacent to the target intersection point is the at least one target split screen.

7. The method according to claim 1, wherein after the generating the screenshot picture, the method further comprises:
recovering, by the electronic device, in the first layer, the screen split state in which the N split screens respectively display the N applications.

8. The method according to claim 7, wherein the in response to the screen capturing operation, displaying, by the electronic device, in full screen, the full-screen interface of the application corresponding to each split screen in the at least one target split screen, and generating a screenshot picture comprises:
sequentially displaying, by the electronic device, in full screen above the first layer, the interface of the application corresponding to each split screen in the at least one target split screen; and
splicing, by the electronic device, the full-displayed interface of the application corresponding to each split screen in the at least one target split screen, to generate the screenshot picture.

9. The method according to claim 7, wherein the in response to the screen capturing operation, displaying, by the electronic device, in full screen, the full-screen interface of the application corresponding to each split screen in the at least one target split screen, and generating a screenshot picture comprises:
sequentially displaying, by the electronic device, in full screen in the first layer, the interface of the application corresponding to each split screen in the at least one target split screen; and
splicing, by the electronic device, the full-displayed interface of the application corresponding to each split screen in the at least one target split screen, to generate the screenshot picture.

10. The method according to claim 7, wherein the method further comprises:
performing, by the electronic device, a target operation on the screenshot picture by using an application corresponding to the to-be-executed split screen.

11. The method according to claim 10, wherein in response to the drag operation and responsive to detecting that the drag operation disappears, determining, by the electronic device, the to-be-executed split screen comprises:
determining, by the electronic device, that a split screen in which an endpoint location of the drag operation is located is the to-be-executed split screen.

12. An electronic device for capturing a screen, wherein the electronic device comprises: one or more processors, a memory, and a display, wherein:
the memory is coupled to the one or more processors, the memory is configured to store computer program code that comprises computer instructions, and the one or more processors invoke the computer instructions to cause the electronic device to:
in a screen split state, display N applications respectively by using N split screens, wherein each split screen of the N split screens is configured to display an interface of one application, and N is a positive integer greater than 1, wherein the N split screens respectively display the N applications in a first layer;
receive a screen capturing operation for at least one target split screen of the N split screens;
in response to the screen capturing operation, display, in full screen, an interface of an application corresponding to each of the at least one target split screen, generate a screenshot picture and display a thumbnail of the screenshot picture above the first layer,
wherein the screenshot picture comprises a full-displayed interface of the application corresponding to each of the at least one target split screen,
wherein the full-displayed interface of the application corresponding to a particular target split screen of the at least one target split screen of the N split screens includes additional content of the interface of the application not displayed in the interface of the application displayed in the particular target split screen;
receive, a drag operation for the thumbnail of the screenshot picture;
in response to the drag operation and in response to detecting that the drag operation disappears, determine, a to-be-executed split screen, including:
obtaining, a quantity of pixels of the thumbnail of the screenshot picture that fall onto each of the N split screens; and
determining, that a split screen corresponding to a largest quantity of pixels that fall onto each of the N split screens is the to-be-executed split screen.

13. The electronic device according to claim 12, wherein the N split screens form M border lines, and M is a positive integer; and
the one or more processors are configured to invoke the computer instructions to cause the electronic device to:
receive the screen capturing operation at a first location; and
determine the at least one target split screen based on the first location and the M border lines.

14. The electronic device according to claim 13, wherein the M border lines are parallel to each other; and
the one or more processors are configured to invoke the computer instructions to cause the electronic device to:
determine a distance between the first location and each of the M border lines, to obtain a first distance set;
determine that a border line corresponding to a smallest distance in the first distance set is a first border line; and
responsive to determining that the smallest distance is greater than a first threshold, determine that a split screen to which the first location belongs in the N split screens is the at least one target split screen.

15. The electronic device according to claim 14, wherein the one or more processors are further configured to invoke the computer instructions to cause the electronic device to:
responsive to determining that the smallest distance is less than or equal to the first threshold, determine that two split screens distinguished by the first border line are the at least one target split screen.

16. The electronic device according to claim 13, wherein the M border lines form at least one intersection point; and
the one or more processors are configured to invoke the computer instructions to cause the electronic device to:
determine a distance between the first location and each of the at least one intersection point, to obtain a second distance set;
determine that an intersection point corresponding to a smallest distance in the second distance set is a target intersection point;
determine a first range based on the target intersection point, wherein the first range uses the target intersection point as a geometric center, and the first range comprises the target intersection point; and
responsive to detecting that the first location is not within the first range, determine that a split screen to which the first location belongs in the N split screens is the at least one target split screen.

17. The electronic device according to claim 12, wherein the one or more processors are configured to invoke the computer instructions to cause the electronic device to:
recover, in the first layer, the screen split state in which the N split screens respectively display the N applications.

18. The electronic device according to claim 17, wherein in response to the screen capturing operation, the electronic device displays, in full screen, the full-screen interface of the application corresponding to each split screen in the at least one target split screen, and generates the screenshot picture; and
the one or more processors are configured to invoke the computer instructions to cause the electronic device to:
sequentially display, in full screen above the first layer, the interface of the application corresponding to each of the at least one target split screen; and
splice the full-displayed interface of the application corresponding to each split screen in the at least one target split screen, to generate the screenshot picture.

19. The electronic device according to claim 17, wherein in response to the screen capturing operation, the electronic device displays, in full screen, the full-screen interface of the application corresponding to each split screen in the at least one target split screen, and generates the screenshot picture; and
the one or more processors are configured to invoke the computer instructions to cause the electronic device to:
sequentially display, in full screen in the first layer, the interface of the application corresponding to each of the at least one target split screen; and
splice the full-displayed interface of the application corresponding to each of the at least one target split screen, to generate the screenshot picture.

20. The electronic device according to claim 12, wherein in response to the drag operation and responsive to detecting that the drag operation disappears, the determining the to-be-executed split screen comprises:
determining, that a split screen in which an endpoint location of the drag operation is located is the to-be-executed split screen.

* * * * *